United States Patent
Fleck et al.

(10) Patent No.: US 11,483,410 B1
(45) Date of Patent: Oct. 25, 2022

(54) INTELLIGENT STATUS AND ENGAGEMENT SYSTEM

(71) Applicant: Citrix Systems, Inc., Ft. Lauderdale, FL (US)

(72) Inventors: Christopher Fleck, Hillsboro Beach, FL (US); Amy Haworth, Ft. Lauderdale, FL (US); Jacob Jared Summers, Coral Springs, FL (US); Manbinder Pal Singh, Coral Springs, FL (US); Sabarish Nadarajan, Pompano Beach, FL (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 0 days.

(21) Appl. No.: 17/369,295

(22) Filed: Jul. 7, 2021

(51) Int. Cl.
*H04L 67/54* (2022.01)
*G06Q 10/10* (2012.01)
(Continued)

(52) U.S. Cl.
CPC .......... *H04L 67/54* (2022.05); *G06Q 10/109* (2013.01); *H04L 51/043* (2013.01);
(Continued)

(58) Field of Classification Search
None
See application file for complete search history.

(56) References Cited

U.S. PATENT DOCUMENTS 6,988,128 B1 * 1/2006 Alexander ........... G06Q 10/109
709/206
7,035,865 B2 * 4/2006 Doss ....................... H04L 51/04
707/999.102

(Continued)

FOREIGN PATENT DOCUMENTS

CN 104967644 A 10/2015
CN 105338154 A 2/2016
(Continued)

OTHER PUBLICATIONS

Microsoft Corporation, Lync 2013 for Office 365 Quick Reference IM, Presence, and Contacts, Copyright 2012, pp. 1-2 (Year: 2012).*
(Continued)

*Primary Examiner* — Backhean Tiv
(74) *Attorney, Agent, or Firm* — Finch & Maloney PLLC

(57) ABSTRACT

A computing device, method, and computer-readable medium storing instructions for determining user availability for one or more messaging applications are provided. For example, the computing device includes a processor for receiving user activity information from a client device including system interaction information and scheduled activity information for a user of the client device. The system interaction information includes information related to the user's current interaction with applications in the distributed workspace and the scheduled activity information includes information pulled from, for example, a calendar and/or scheduling application associated with the user. The processor processes the user activity information to determine a current user status for the user and output the current user status for the user of the client device to additional users of the one or more messaging applications. Based upon the current user status, messages from additional users of the messaging applications are filtered appropriately.

20 Claims, 16 Drawing Sheets

(51) Int. Cl.
*H04L 51/046* (2022.01)
*H04L 67/306* (2022.01)
*H04L 51/043* (2022.01)
*H04L 67/50* (2022.01)

(52) U.S. Cl.
CPC .......... *H04L 51/046* (2013.01); *H04L 67/306* (2013.01); *H04L 67/535* (2022.05)

(56) References Cited

U.S. PATENT DOCUMENTS

| | | | | |
|---|---|---|---|---|
| 7,139,797 | B1* | 11/2006 | Yoakum | H04L 65/1094 709/204 |
| 7,483,969 | B2* | 1/2009 | Chavda | G06Q 10/107 709/223 |
| 7,945,612 | B2* | 5/2011 | Raghav | G06Q 10/107 709/227 |
| 8,345,601 | B2* | 1/2013 | Lazaridis | G06F 3/04817 370/328 |
| 8,352,555 | B2* | 1/2013 | Channabasavaiah | H04L 51/04 709/204 |
| 8,374,590 | B1* | 2/2013 | Mikan | H04H 60/45 455/414.3 |
| 8,478,859 | B2* | 7/2013 | McMurry | H04L 51/043 709/224 |
| 9,021,031 | B1* | 4/2015 | Jansson | H04L 67/54 709/227 |
| 9,398,107 | B1* | 7/2016 | Rai | H04L 67/56 |
| 9,574,671 | B1* | 2/2017 | Amberg | H04W 4/02 |
| 10,368,184 | B2* | 7/2019 | Upadhyaya | H04W 4/029 |
| 10,454,855 | B2* | 10/2019 | Rife | H04L 51/043 |
| 10,516,964 | B2* | 12/2019 | Dotan-Cohen | H04M 1/72454 |
| 10,645,088 | B1* | 5/2020 | Yanes | H04L 63/1425 |
| 10,915,866 | B2* | 2/2021 | Bay | H04L 51/42 |
| 2002/0083127 | A1* | 6/2002 | Agrawal | H04M 3/42229 709/227 |
| 2002/0143916 | A1* | 10/2002 | Mendiola | G06Q 10/107 709/223 |
| 2004/0170263 | A1* | 9/2004 | Michael | H04L 67/59 379/201.1 |
| 2004/0249776 | A1* | 12/2004 | Horvitz | G06Q 10/109 706/21 |
| 2005/0114777 | A1* | 5/2005 | Szeto | G06Q 10/109 715/705 |
| 2006/0004911 | A1* | 1/2006 | Becker | G06Q 10/107 709/207 |
| 2006/0015609 | A1* | 1/2006 | Hagale | H04L 67/535 709/224 |
| 2007/0061405 | A1* | 3/2007 | Keohane | G06Q 10/109 709/207 |
| 2008/0005235 | A1* | 1/2008 | Hegde | G06Q 10/10 709/204 |
| 2008/0005294 | A1* | 1/2008 | Morris | H04L 67/146 709/223 |
| 2008/0140498 | A1* | 6/2008 | Setty | G06Q 10/109 705/7.18 |
| 2008/0242231 | A1* | 10/2008 | Gray | H04L 67/04 455/66.1 |
| 2008/0294772 | A1* | 11/2008 | Hagale | H04L 67/535 709/224 |
| 2009/0222516 | A1* | 9/2009 | Holmes | H04L 51/04 709/204 |
| 2009/0262668 | A1* | 10/2009 | Hemar | H04L 65/401 370/352 |
| 2010/0064014 | A1* | 3/2010 | McLaughlin | H04L 67/54 709/206 |
| 2011/0072128 | A1* | 3/2011 | Carr | H04L 67/54 709/224 |
| 2011/0202602 | A1* | 8/2011 | Biollo | H04L 51/066 709/224 |
| 2012/0296919 | A1* | 11/2012 | Sinha | H04L 67/535 707/E17.064 |
| 2014/0040345 | A1* | 2/2014 | Delos Reyes | H04L 67/54 709/203 |
| 2014/0342685 | A1* | 11/2014 | Biswas | H04L 67/54 455/566 |
| 2015/0074557 | A1* | 3/2015 | Reinhardt | G06F 16/9535 715/753 |
| 2016/0080306 | A1* | 3/2016 | Kesarwani | G06F 3/0485 709/204 |
| 2016/0094938 | A1* | 3/2016 | Upadhyaya | H04W 4/029 455/456.3 |
| 2016/0241654 | A1* | 8/2016 | Cunico | H04L 67/535 |
| 2016/0275458 | A1* | 9/2016 | Meushar | G06Q 10/109 |
| 2017/0289076 | A1* | 10/2017 | Rife | H04L 67/54 |
| 2018/0083905 | A1 | 3/2018 | Jayaram et al. | |
| 2019/0190861 | A1* | 6/2019 | Nazmi | H04L 51/52 |
| 2019/0205839 | A1* | 7/2019 | Dotan-Cohen | H04L 67/535 |
| 2019/0372962 | A1 | 12/2019 | Maria | |
| 2020/0092382 | A1 | 3/2020 | Borkar et al. | |
| 2020/0120159 | A1 | 4/2020 | Momchilov et al. | |
| 2020/0167210 | A1 | 5/2020 | Attard et al. | |
| 2020/0258001 | A1* | 8/2020 | Peterson | H04L 67/54 |
| 2021/0051120 | A1 | 2/2021 | Pottier | |
| 2021/0126983 | A1* | 4/2021 | Bellet | H04L 51/216 |
| 2021/0256786 | A1* | 8/2021 | Manam | G06Q 50/163 |
| 2021/0263726 | A1* | 8/2021 | Stewart | H04L 67/535 |

FOREIGN PATENT DOCUMENTS

| | | |
|---|---|---|
| CN | 105656754 A | 6/2016 |
| CN | 110224924 A | 9/2019 |
| CN | 110517159 A | 11/2019 |
| CN | 112615958 A | 4/2021 |

OTHER PUBLICATIONS

PCT International Search Report and Written Opinion for Application No. PCT/CN2020/120557 dated Jul. 9, 2021, 9 pages.

International Search Report and Written Opinion, Issued for PCT Application No. PCT/CN2021/129973, dated Apr. 26, 2022 (9 pgs).

* cited by examiner

INTELLIGENT STATUS AND ENGAGEMENT SYSTEM

BACKGROUND

In network environments, a server can host or provide access to a plurality of resources or applications for a plurality of users. These applications typically include one or more messaging applications. Included in standard features with most messaging applications is a limited visual indication of a user's availability. This availability is generally based upon current user activity/interaction with the messaging application and/or from accessing additional data related to the user such as the user's calendar. Based upon this data, the messaging applications can provide an indication of user availability showing whether the user is available or away without additional status or insight.

SUMMARY

In at least one example, a computing device for determining user availability for at least one messaging application is provided. The computing device includes a computer readable medium and at least one processor operably coupled to the computer readable medium. The at least one processor is configured to receive scheduled activity information for a user of a client device from the client device, receive system interaction information from the client device, the system interaction information including updated information regarding real-time interactions between the user of the client device and one or more applications accessible on the client device, process the scheduled activity information and the system interaction information to determine a current user status for the user of the client device, the current user status indicating a user's availability to communicate using at least one messaging application, and output the current user status for the user of the client device to additional users of the at least one messaging application.

Implementations of the computing device for determining user availability for at least one messaging application can include one or more of the following features.

In examples of the computing device, the at least one processor can further be configured to receive a communication request from at least one of the additional users of the at least one messaging application to establish communication with the user of the client device and process the communication request based upon the current user status for the user of the client device. In some examples, the at least one processor is configured to process the communication request based upon the current user status for the user of the client device by being further configured to determine whether the user of the client device is one or more of available and/or interruptible and if the user of the client device is one or more of available and/or interruptible, process the communication request to establish communication between the user of the client device and the at least one additional user.

In examples of the computing device, the at least one processor can further be configured to receive updated system interaction information and/or updated scheduled activity information from the client device, process the updated system interaction information and/or updated scheduled activity information to determine and updated user status for the user of the client device, and output the updated user status for the user of the client device to the additional users of the at least one messaging application.

In examples of the computing device, the at least one processor can further be configured to determine historical user information for the user of the client device based upon previous user sessions of the at least one messaging application by the user of the client device and determine the current user status for the user of the client device based upon the scheduled activity information, the system interaction information, and the historical user information for the user of the client device.

In examples of the computing device, the at least one processor can further be configured to receive a communication request from at least one of the additional users of the at least one messaging application to establish communication with the user of the client device, determine a role and associated level of access for the at least one of the additional users associated with the communication request, and process the communication request based upon the current user status for the user of the client device and the determined role and associated level of access for the at least one of the additional users associated with the communication request.

In examples of the computing device, the current user status of the user can include at least one of available, busy but interruptible, focused, and uninterruptible.

In examples of the computing device, the system interaction information can include real-time interaction information related to a non-messaging application the user of the client device is currently accessing and the scheduled activity information includes information received from a calendar application associated with the user of the client device.

In another example, a method of determining user availability for at least one messaging application is provided. The method includes receiving, by a processor, scheduled activity information for a user of a client device from the client device; receiving, by the processor, system interaction information from the client device, the system interaction information including updated information regarding real-time interactions between the user of the client device and one or more applications accessible on the client device; processing, by the processor, the scheduled activity information and the system interaction information to determine to determine a current user status for the user of the client device, the current user status indicating a user's availability to communication using at least one messaging application; and outputting, by the processor, the current user status for the user of the client device to additional users of the at least one messaging application.

Implementations of the method of determining user availability for at least one messaging application can include one or more of the following features.

In examples of the method, the method can further include receiving, by the processor, a communication request from at least one of the additional users of the at least one messaging application to establish communication with the user of the client device and processing, by the processor, the communication request based upon the current user status for the user of the client device. In some examples, processing the communication request based upon the current user status for the user of the client device can include determining, by the processor, whether the user of the client device is one or more of available and/or interruptible and, if the user of the client device is one or more of available and/or interruptible, processing, by the processor, the communication request to establish communication between the user of the client device and the at least one additional user.

In examples of the method, the method can further include receiving, by the processor, updated system interaction information and/or updated scheduled activity information from the client device; processing, by the processor, the updated system interaction information and/or updated scheduled activity information to determine and updated user status for the user of the client device; and outputting, by the processor, the updated user status for the user of the client device to the additional users of the at least one messaging application.

In examples of the method, the method can further include determining, by the processor, historical user information for the user of the client device based upon previous user sessions of the at least one messaging application by the user of the client device and determining, by the processor, the current user status for the user of the client device based upon the scheduled activity information, the system interaction information, and the historical user information for the user of the client device.

In examples of the method, the method can further include receiving, by the processor, a communication request from at least one of the additional users of the at least one messaging application to establish communication with the user of the client device; determining, by the processor, a role and associated level of access for the at least one of the additional users associated with the communication request; and processing, by the processor, the communication request based upon the current user status for the user of the client device and the determined role and associated level of access for the at least one of the additional users associated with the communication request.

In examples of the method, the current user status of the user can include at least one of available, busy but interruptible, focused, and uninterruptible.

In examples of the method, the system interaction information can include real-time interaction information related to a non-messaging application the user of the client device is currently accessing and the scheduled activity information includes information received from a calendar application associated with the user of the client device.

In another example, a non-transitory computer-readable medium storing computer-executable instructions to implement a process of determining user availability for at least one messaging application is provided. The instructions includes instructions to receive scheduled activity information for a user of a client device from the client device; receive system interaction information from the client device, the system interaction information including updated information regarding real-time interactions between the user of the client device and one or more applications accessible on the client device; process the scheduled activity information and the system interaction information to determine a current user status for the user of the client device, the current user status indicating a user's availability to communicate using at least one messaging application; and output the current user status for the user of the client device to additional users of the at least one messaging application.

Implementations of the non-transitory computer-readable medium storing computer-executable instructions to implement a process of determining user availability for at least one messaging application can include one or more of the following features.

In examples of the non-transitory computer-readable medium, the instructions can further include instructions to receive a communication request from at least one of the additional users of the at least one messaging application to establish communication with the user of the client device; determine whether the user of the client device is one or more of available and/or interruptible; and if the user of the client device is one or more of available and/or interruptible, process the communication request to establish communication between the user of the client device and the at least one additional user.

In examples of the non-transitory computer-readable medium, the instructions can further include instructions to receive updated system interaction information and/or updated scheduled activity information from the client device; process the updated system interaction information and/or updated scheduled activity information to determine and updated user status for the user of the client device; and output the updated user status for the user of the client device to the additional users of the at least one messaging application.

In examples of the non-transitory computer-readable medium, the instructions can further include instructions to receive a communication request from at least one of the additional users of the at least one messaging application to establish communication with the user of the client device; determine a role and associated level of access for the at least one of the additional users associated with the communication request; and process the communication request based upon the current user status for the user of the client device and the determined role and associated level of access for the at least one of the additional users associated with the communication request.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
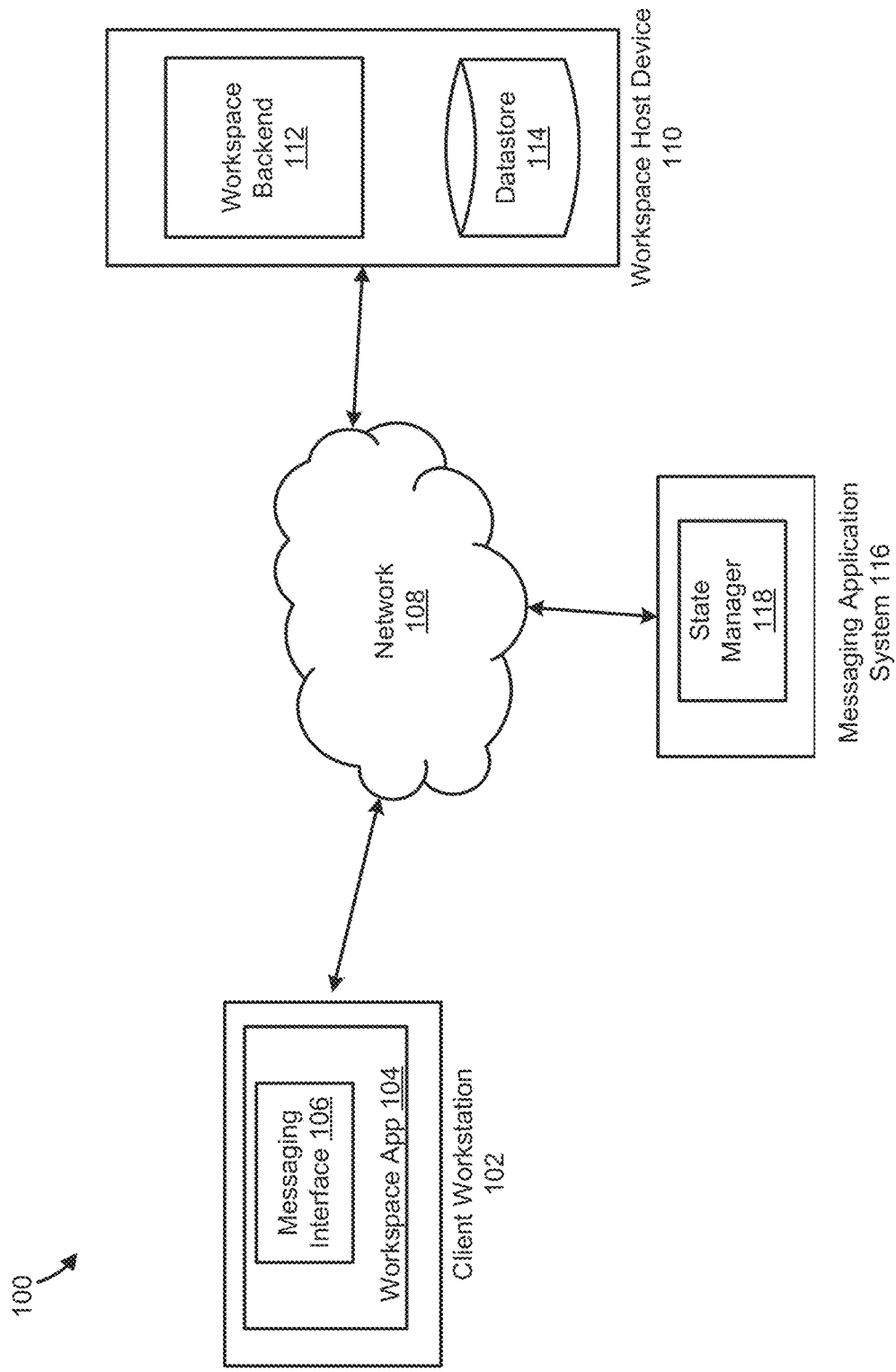
FIG. 1 is a block diagram of a system architecture for accessing a distributed workspace by multiple client devices.

As summarized above, various examples described herein are directed to systems and methods for providing dynamic and intelligible status updates for users of one or more messaging applications. For example, the systems and methods as described herein monitor both scheduled user activity as well as system interaction information for an individual user to determine their current status, and whether the user is likely to be amenable to be interrupted during their current activity.

Current messaging applications often include a user status indicator. Typically, this indicator is set based upon information pulled from a calendar or scheduling application for the user and is not able to be dynamically updated based upon the current user's activity. For example, if the user is currently using a particular application and is focused on their work, the messaging application may still indicate the user is available if the user has no activities currently scheduled on their calendar or scheduling application. The messaging application may provide the user with the ability to manually set their availability, but this process can be tedious, and a typical user is unlikely to constantly update their availability based upon their current activity.

The systems and methods as described herein overcome the disadvantages and limitations of traditional messaging applications by providing a current user status that is determined based upon both scheduled user activity as well as current and ongoing system interaction information as monitored and determined for the user. Such systems and methods as described herein provide various advantages to improve traditional messaging applications and user experience with those messaging applications. For example, by removing the need for a user to manually update their availability, a user's interaction with the messaging application is simplified while still providing an accurate and meaningful representation of a current status level for the user. For example, if the user is engaged in an application and monitored keyboard activity or the user indicates that they are interacting continually with the application the messaging application as described herein may indicate that the user is currently unavailable or uninterruptible as they are focused on a particular task. Such a status update is unavailable with traditional messaging applications that rely solely on scheduled user activities to provide status updates or on manually input user information to update their status.

Thus, and in accordance with at least some examples disclosed herein, systems and methods for determining user availability for one or more messaging applications is provided. These systems and methods enhance the quality of a user's experience with the messaging application by providing an accurate and dynamically updated status for the user as the user interacts with, for example, a distributed workspace, thereby reducing the chance that a user will receive a message when the user would prefer to be uninterrupted.

In some examples, a computing device for determining user availability for one or more messaging applications is provided. The computing device includes a computer readable medium and at least one processor operably coupled to the computer readable medium. The at least one processor can be configured to receive user activity information from a client device, the user activity information including system interaction information and scheduled activity information for a user of the client device. As described herein, the system interaction information can include information related to the user's current interaction with one or more applications in the distributed workspace. The scheduled activity information can include information pulled or otherwise received from, for example, a calendar and/or scheduling application associated with the user. The at least one processor can be further configured to process the user activity information to determine a current user status for the user of the client device, the current user status indicating a user's availability to communicate using one or more messaging applications and output the current user status for the user of the client device to additional users of the one or more messaging applications. Based upon the current user status, messages from the additional users of the messaging applications can be filtered appropriately.

Examples of the methods, systems, and processes discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Sample Computing Systems

In some examples, a distributed system is configured to implement workspace and system access to remote users, thereby providing a central repository of applications, files, and other similar resources to a group of trusted users accessible via, for example, an enterprise service. A distributed workspace can be implemented as a software framework designed to deliver and manage a user's applications, data, and desktops in a consistent and secure manner, regardless of the user's device or location. Distributed workspaces enhance the user experience by streamlining and automating those tasks that a user performs frequently, such as approving expense reports, confirming calendar appointments, submitting helpdesk tickets, and reviewing vacation requests. A distributed workspace allows users to access functionality provided by multiple enterprise applications—including software as a system (SaaS) applications, web applications, desktop applications, and proprietary applications—through a single interface.

FIG. 1 illustrates a logical architecture of one implementation of, for example, a distributed workspace system 100 that is configured to connect one or more client computing devices with one or more remote computing devices configured to host shared resources such as applications accessible via the distributed workspace. As shown in FIG. 1, the system 100 can include a client device 102. As further shown in FIG. 1, client devices 102 can include a workspace application 104. The workspace application 104 can be configured to provide an interface to facilitate remote access to one or more resources hosted at or by, for example, a remote computing device such as workspace host device 110. In certain implementations, the client device 102 can be operably connected to the remote computing device via one or more networks 108. In some examples, the network 108 can be a wired network, a wireless network, or a combination of both wired and wireless networks.

In some examples, the workspace host device 110 can execute, operate, or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft Internet Protocol telephone; an application for streaming video and/or audio; an application for facilitating real-time-data communications; a HyperText Transfer Protocol (HTTP) client; a File Transfer Protocol (FTP) client; an Oscar client; a Telnet client; or any other set of executable instructions.

In some examples, the workspace host device 110 can execute a remote presentation services program or other program that uses a thin client or a remote-display protocol to capture display output generated by an application executing on the remote computing device and transmit the application display output to the client device 102 for presentation to one or more device users.

In some examples, the workspace host device 110 can include a server agent that is configured to communicate with the workspace application 104. The server agent can be configured to, for example, authenticate a client device, provide secure access to one or more remote and/or shared resources, monitor user interactions with the resources, update user access based upon changes to user permission levels for a client device, distribute or properly direct requests to available resources, and perform other similar distributed workspace functions.

In yet other examples, the workspace host device 110 can be configured to execute a virtual machine providing access to a computing environment to a user of client device 102. The virtual machine can be managed by, for example, a hypervisor, a virtual machine manager (VMM), or any other hardware virtualization technique within the workspace host device 110.

In some examples, the network 108 can be: a local area network (LAN); a metropolitan area network (MAN); a wide area network (WAN); a primary public network; and a primary private network. Additional examples can include a network 108 of mobile telephone networks that use various protocols to communicate among mobile devices. For short range communications within a wireless local-area network (WLAN), the protocols can include 802.11, Bluetooth, and Near Field Communication (NFC).

It should be noted that the specific device architecture as shown in FIG. 1 is provided by way of example only. For instance, in certain implementations, multiple remote computing devices can be operably connected to the client devices via, for example, one or more network appliances configured to perform, for example, access control and load balancing. Additional network examples and associated devices are described below in the discussion of FIG. 3.

In a typical distributed workspace, a user of the client device 102 can access a messaging application interface 106 through, for example, workspace application 104. For example, the user can message other users of the distributed workspace system 100 using the messaging application interface 106. Messaging information and/or data can be processed by the workspace application 104 and transmitted to a workspace backend 112 on the workspace host device 110.

Figure 2:
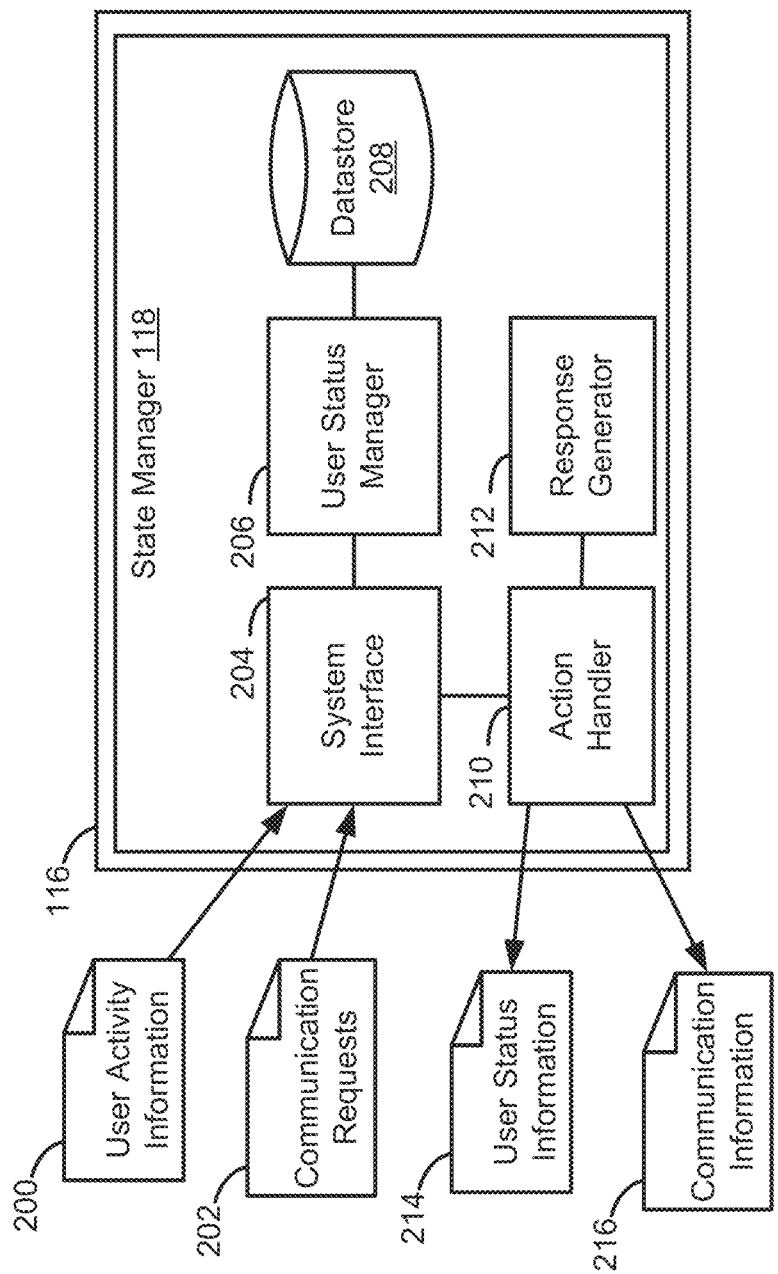
FIG. 2 is a block diagram of a state manager for a messaging application system in accordance with an example of the present disclosure.

As noted above, to further process messaging application information, the distributed workspace system 100 can include a messaging application system 116. As further shown in FIG. 1, the messaging application system 116 can include state manager 118. The state manager 118 can be configured to monitor user activity at, for example, the client workstation 102 as well as process messaging application information transmitted throughout the distributed workspace system 100. FIG. 2 Illustrates a detailed view of the messaging application system 116 and the state manager 118. For example, as shown in FIG. 2, the messaging application system 116 can be configured to receive both user activity information 200 and one or more communication requests 202. The state manager 118 can includes a system interface 204 configured to receive and process incoming data such as user activity information 200 and communication requests 202. The system interface 204 can process the user activity information 200 and pass the user activity information 200 to a user status manager 206. The user status manager 206 can be configured to analyze the user activity information 200 and determine a current activity level for a user of, for example, the client workstation 102 based upon the user activity information 200.

As further shown in FIG. 2, the user status manager 206 can be operably coupled to a datastore 208. The user status manager 206 can be configured to store at least a portion of the user activity information 200 In the datastore 208 as, for example, historic user information, for later processing.

The system interface 204 can also be operably coupled to an action handler 210. The action handler 210 can be configured to receive information from the system interface 204, process the information, and generate output information for transmission to one or more devices within, for example, the distributed workspace system 100. For example, the action handler 210 can be configured to receive user status information from the system interface 204 and output the user status information to one or more devices within the distributed workspace system 100. For example, as shown in FIG. 2, the action handler 210 can be configured to output user status information 214 to one or more devices within the distributed workspace system 100. The action handler 210 can also be configured to process the communication requests 202 as received from the system interface 204. For example, the communication requests 202 can include a request to establish communications between a first device and a second device of the distributed workspace system 100. The action handler 210 can process the communication request 202, determine an action to be taken in response to the communication request 202, and execute the response action. In certain implementations, the action handler 210 can be operably coupled to a response generator 212. The response generator 212 can be configured to process information received from the action handler 210, generate an appropriate response, and provide the response to the action handler 210 for transmission to one or more devices within the distributed workspace system 100.

For example, the system interface 204 can receive a communication request 202 to establish communication session between a first client and a second client within the distributed workspace system 100. The action handler 210 can process the received communication request 202, communicate with the response generator 212 to generate a response to the communication request 202, and output a response to the communication request 202 as, for example, communication information 216. As such, messaging application system 116 as described herein and shown in FIGS. 1 and 2 can be configured to both determine, process, and output user activity levels as well as process responses to communication requests between computing devices within the distributed workspace system 100.

Figure 3:
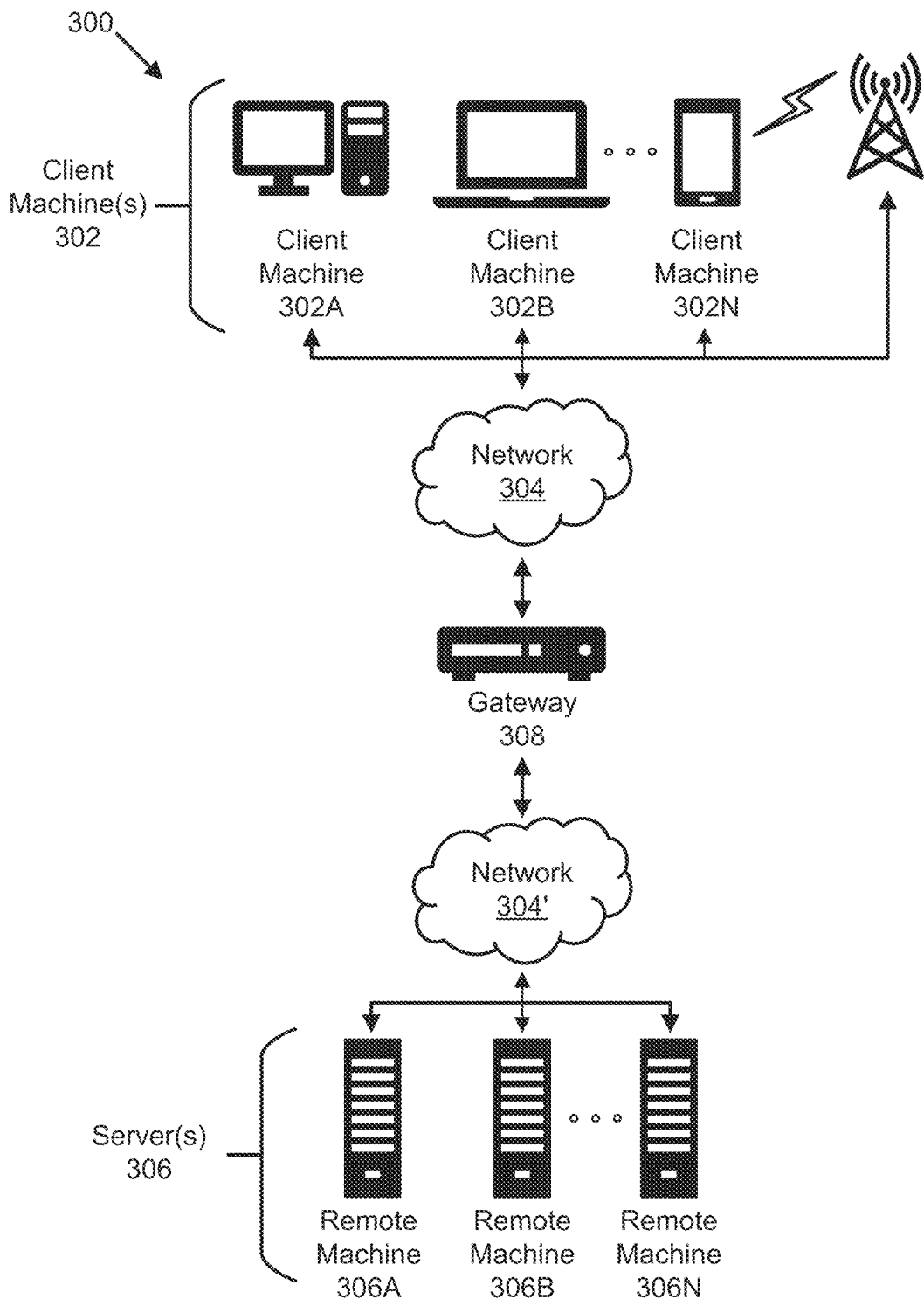
FIG. 3 is a block diagram of a sample network environment of computing devices in which various aspects of the present disclosure can be implemented.

As noted above in FIG. 1, various computing devices can be arranged into one or more interconnected networks to provide user access to remote resources through various client devices. Referring to FIG. 3, a non-limiting network environment 300 provides an alternative arrangement to network 100 as shown in FIG. 1, in which various aspects of the disclosure can be implemented. As shown in FIG. 3, the environment 300 includes one or more client machines 302A-302N, one or more remote machines 306A-306N, one or more networks 304, 304', and one or more appliances 308 installed within the computing environment 300. The client machines 302A-302N communicate with the remote machines 306A-306N via the networks 304, 304'. The computing environment 300 can also be referred to as a distributed computer system.

In some examples, the client machines 302A-302N communicate with the remote machines 306A-306N via an intermediary appliance 308. The illustrated appliance 308 is positioned between the networks 304, 304' and can also be referred to as a network interface or gateway. In some examples, the appliance 308 can operate as remote computing device configured to provide clients with access to business applications and other data deployed in a datacenter, the cloud, or delivered as SaaS applications across a range of client devices, and/or provide other functionality such as load balancing, etc. In some examples, multiple appliances 308 can be used, and the appliance(s) 308 can be deployed as part of the network 304 and/or 304'.

The client machines 302A-302N can be generally referred to as client machines 302, local machines 302, clients 302, client nodes 302, client computers 302, client devices 302, computing devices 302, endpoints 302, or endpoint nodes 302. In certain implementations, client machines 302 can include, for example, client device 102 as shown in FIG. 1 and described above.

The remote machines 306A-306N can be generally referred to as servers 306 or a server farm 306. In some examples, a client device 302 can have the capacity to function as both a client node seeking access to resources provided by a server 306 and as a server 306 providing access to hosted resources for other client devices 302A-302N. The networks 304, 304' can be generally referred to as a network 304. The networks 304 can be configured in any combination of wired and wireless networks.

A server 306 can be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality. In some examples, a server 306 can include the functionality of the workspace host device 110 as shown in FIG. 1 and described above.

A server 306 can execute, operate, or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft Internet Protocol telephone; an application for streaming video and/or audio; an application for facilitating real-time-data communications; a HyperText Transfer Protocol client; a File Transfer Protocol client; an Oscar client; a Telnet client; or any other set of executable instructions.

In some examples, a server 306 can execute a remote presentation services program or other program that uses a thin client or a remote-display protocol to capture display output generated by an application executing on a server 306 and transmit the application display output to a client device 302.

In yet other examples, a server 306 can execute a virtual machine providing, to a user of a client device 302, access to a computing environment. The client device 302 can be a virtual machine. The virtual machine can be managed by, for example, a hypervisor, a virtual machine manager (VMM), or any other hardware virtualization technique within the server 306.

In some examples, the network 304 can be: a LAN; a MAN; a WAN; a primary public network; and a primary private network. Additional examples can include a network 304 of mobile telephone networks that use various protocols to communicate among mobile devices. For short range communications within a WLAN, the protocols can include 802.11, Bluetooth, and NFC. In certain examples, the network 304 can include network 108 as shown in FIG. 1 and described above.

Figure 4:
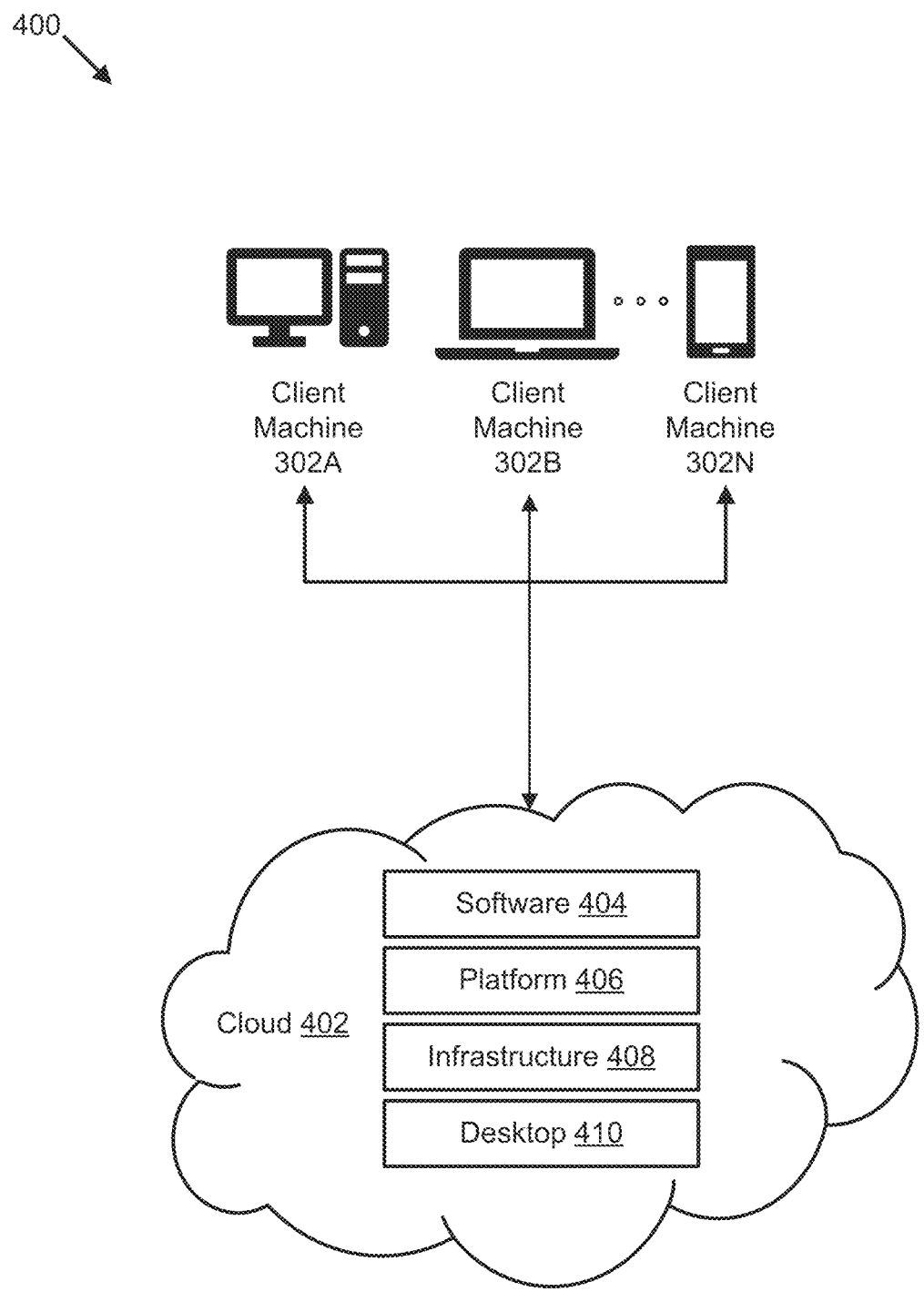
FIG. 4 is a block diagram of a cloud computing environment in which various aspects of the present disclosure can be implemented.

Referring to FIG. 4, a cloud computing environment 400 is depicted, which can also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 302a-302n (such as those described above and shown in FIG. 3) are in communication with a cloud network 402. The cloud network 402 can include back-end platforms, e.g., servers, storage, server farms or data centers. The users or clients 302a-302n can correspond to a single organization/tenant or multiple organizations/tenants. More particularly, in one example implementation the cloud computing environment 400 can provide a private cloud serving a single organization (e.g., enterprise cloud). In another example, the cloud computing environment 400 can provide a community or public cloud serving multiple organizations/tenants.

In some examples, a gateway appliance(s) or service can be utilized to provide access to cloud computing resources and virtual sessions. By way of example, Citrix Gateway, provided by Citrix Systems, Inc., can be deployed on-premises or on public clouds to provide users with secure access and single sign-on to virtual, SaaS and web applications. Furthermore, to protect users from web threats, a gateway such as Citrix Secure Web Gateway can be used. Citrix Secure Web Gateway uses a cloud-based service and a local cache to check for uniform resource locator (URL) reputation and category.

In still further examples, the cloud computing environment 400 can provide a hybrid cloud that is a combination of a public cloud and a private cloud. Public clouds can include public servers that are maintained by third parties to the clients 302a-302n or the enterprise/tenant. The servers can be located off-site in remote geographical locations or otherwise.

The cloud computing environment 400 can provide resource pooling to serve multiple users via clients 302a-302n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some implementations, the cloud computing environment 400 can provide on-demand self-service to unilaterally provision computing capabilities (e.g., server time, network storage) across a network for multiple clients 302a-302n. By way of example, provisioning services can be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 302. In some examples, the cloud computing environment 400 can include or provide monitoring services to monitor, control and/or generate reports corresponding to the provided shared services and resources.

In some implementations, the cloud computing environment 400 can provide cloud-based delivery of different types of cloud computing services, such as SaaS 404, Platform as a Service (PaaS) 406, Infrastructure as a Service (IaaS) 408, and Desktop as a Service (DaaS) 410, for example. IaaS can refer to a user renting the use of infrastructure resources that are needed during a specified time period. IaaS providers can offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers can offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers can offer the resources that PaaS provides, including storage, networking, servers, virtualization, operating system, middleware, or runtime resources. In some examples, SaaS providers can offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS can also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms can be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace application can be used as a single-entry point for bringing apps, files and desktops together (whether on-premises or in the cloud) to deliver a unified experience.

Figure 5A:
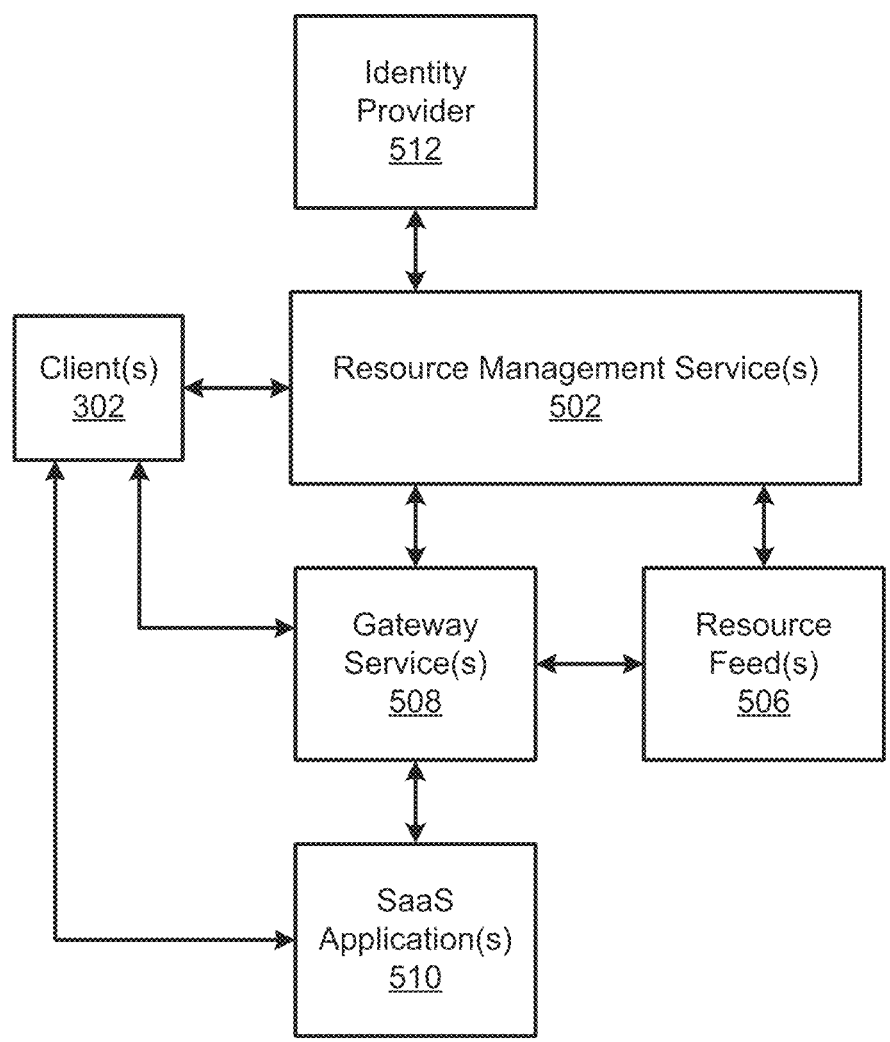
FIGS. 5A-5C are block diagrams of sample systems in which resource management services can manage and streamline client access to resource feeds, in accordance with an example of the present disclosure.

FIG. 5A is a block diagram of an example system 500 in which one or more resource management services 502 can manage and streamline access by one or more clients 302 to one or more resource feeds 506 (via one or more gateway services 508) and/or one or more SaaS applications 510. In particular, the resource management service(s) 502 can employ an identity provider 512 to authenticate the identity of a user of a client 302 and, following authentication, identify one or more resources the user is authorized to access. In response to the user selecting one of the identified resources, the resource management service(s) 502 can send appropriate access credentials to the requesting client 302, and the client 302 can then use those credentials to access the selected resource. For the resource feed(s) 506, the client 302 can use the supplied credentials to access the selected resource via a gateway service 508. For the SaaS application(s) 510, the client 302 can use the credentials to access the selected application directly.

The client(s) 302 can be any type of computing devices capable of accessing the resource feed(s) 506 and/or the SaaS application(s) 510, and can, for example, include a variety of desktop or laptop computers, smartphones, tablets, etc. The resource feed(s) 506 can include any of numerous resource types and can be provided from any of numerous locations. In some implementations, for example, the resource feed(s) 506 can include one or more systems or services for providing virtual applications and/or desktops to the client(s) 302, one or more file repositories and/or file sharing systems, one or more secure browser services, one or more access control services for the SaaS applications 510, one or more management services for local applications on the client(s) 302, one or more internet enabled devices or sensors, etc. Each of the resource management service(s) 502, the resource feed(s) 506, the gateway service(s) 508, the SaaS application(s) 510, and the identity provider 512 can be located within an on-premises data center of an organization for which the system 500 is deployed, within one or more cloud computing environments, or elsewhere.

Figure 5B:
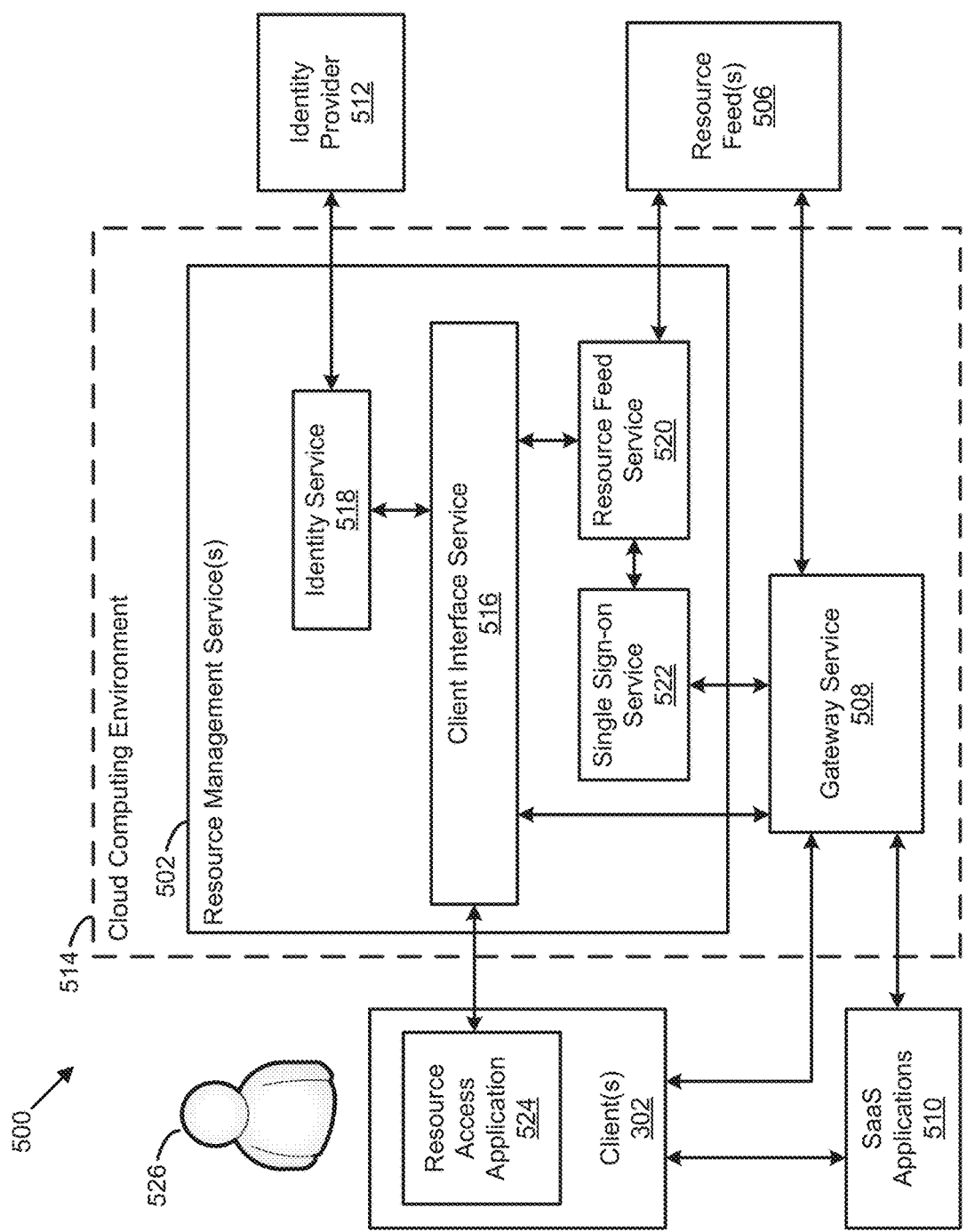

FIG. 5B is a block diagram showing an example implementation of the system 500 shown in FIG. 5A in which various resource management services 502 as well as a gateway service 508 are located within a cloud computing environment 514. The cloud computing environment can, for example, include Microsoft Azure Cloud, Amazon Web Services, Google Cloud, or IBM Cloud.

For any of illustrated components (other than the client 302) that are not based within the cloud computing environment 514, cloud connectors (not shown in FIG. 5B) can be used to interface those components with the cloud computing environment 514. Such cloud connectors can, for example, run on Windows Server instances hosted in resource locations and can create a reverse proxy to route traffic between the site(s) and the cloud computing environment 514. In the illustrated example, the cloud-based resource management services 502 include a client interface service 516, an identity service 518, a resource feed service 520, and a single sign-on service 522. As shown, in some examples, the client 302 can use a resource access application 524 to communicate with the client interface service 516 as well as to present a user interface on the client 302 that a user 526 can operate to access the resource feed(s) 506 and/or the SaaS application(s) 510. The resource access application 524 can either be installed on the client 302, or can be executed by the client interface service 516 (or elsewhere in the system 500), and accessed using a web browser (not shown in FIG. 5B) on the client 302.

As explained in more detail below, in some examples, the resource access application 524 and associated components can provide the user 526 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data. For example, as described herein, the resource application 524 can include some or all of the functionality of the messaging application system 116 and/or the state manager 118 as shown in FIG. 1 and described above.

When the resource access application 524 is launched or otherwise accessed by the user 526, the client interface service 516 can send a sign-on request to the identity service 518. In some implementations, the identity provider 512 can be located on the premises of the organization for which the system 500 is deployed. The identity provider 512 can, for example, correspond to an on-premises Windows Active Directory. In such examples, the identity provider 512 can be connected to the cloud-based identity service 518 using a cloud connector (not shown in FIG. 5B), as described above. Upon receiving a sign-on request, the identity service 518 can cause the resource access application 524 (via the client interface service 516) to prompt the user 526 for the user's authentication credentials (e.g., user-name and password). Upon receiving the user's authentication credentials, the client interface service 516 can pass the credentials along to the identity service 518, and the identity service 518 can, in turn, forward them to the identity provider 512 for authentication, for example, by comparing them against an Active Directory domain. Once the identity service 518 receives confirmation from the identity provider 512 that the user's identity has been properly authenticated, the client interface service 516 can send a request to the resource feed service 520 for a list of subscribed resources for the user 526.

In other examples (not illustrated in FIG. 5B), the identity provider 512 can be a cloud-based identity service, such as a Microsoft Azure Active Directory. In such implementations, upon receiving a sign-on request from the client interface service 516, the identity service 518 can, via the client interface service 516, cause the client 302 to be redirected to the cloud-based identity service to complete an authentication process. The cloud-based identity service can then cause the client 302 to prompt the user 526 to enter the user's authentication credentials. Upon determining the user's identity has been properly authenticated, the cloud-based identity service can send a message to the resource access application 524 indicating the authentication attempt was successful, and the resource access application 524 can then inform the client interface service 516 of the successful authentication. Once the identity service 518 receives confirmation from the client interface service 516 that the user's identity has been properly authenticated, the client interface service 516 can send a request to the resource feed service 520 for a list of subscribed resources for the user 526.

For each configured resource feed, the resource feed service 520 can request an identity token from the single sign-on service 522. The resource feed service 520 can then pass the feed-specific identity tokens it receives to the points of authentication for the respective resource feeds 506. Each resource feed 506 can then respond with a list of resources configured for the respective identity. The resource feed service 520 can then aggregate all items from the different feeds and forward them to the client interface service 516, which can cause the resource access application 524 to present a list of available resources on a user interface of the client 302. The list of available resources can, for example, be presented on the user interface of the client 302 as a set of selectable icons or other elements corresponding to accessible resources. The resources so identified can, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 302, and/or one or more SaaS applications 510 to which the user 526 has subscribed. The lists of local applications and the SaaS applications 510 can, for example, be supplied by resource feeds 506 for respective services that manage which such applications are to be made available to the user 526 via the resource access application 524. Examples of SaaS applications 510 that can be managed and accessed as described herein include Microsoft Office 365 applications, SAP SaaS applications, Workday applications, etc.

For resources other than local applications and the SaaS application(s) 510, upon the user 526 selecting one of the listed available resources, the resource access application 524 can cause the client interface service 516 to forward a request for the specified resource to the resource feed service 520. In response to receiving such a request, the resource feed service 520 can request an identity token for the corresponding feed from the single sign-on service 522. The resource feed service 520 can then pass the identity token received from the single sign-on service 522 to the client interface service 516 where a launch ticket for the resource can be generated and sent to the resource access application 524. Upon receiving the launch ticket, the resource access application 524 can initiate a secure session to the gateway service 508 and present the launch ticket. When the gateway service 508 is presented with the launch ticket, it can initiate a secure session to the appropriate resource feed and present the identity token to that feed to seamlessly authenticate the user 526. Once the session initializes, the client 302 can proceed to access the selected resource.

When the user 526 selects a local application, the resource access application 524 can cause the selected local application to launch on the client 302. When the user 526 selects a SaaS application 510, the resource access application 524 can cause the client interface service 516 request a one-time URL from the gateway service 508 as well a preferred browser for use in accessing the SaaS application 510. After the gateway service 508 returns the one-time URL and identifies the preferred browser, the client interface service 516 can pass that information along to the resource access application 524. The client 302 can then launch the identified browser and initiate a connection to the gateway service 508. The gateway service 508 can then request an assertion from the single sign-on service 522. Upon receiving the assertion, the gateway service 508 can cause the identified browser on the client 302 to be redirected to the logon page for identified SaaS application 510 and present the assertion. The SaaS can then contact the gateway service 508 to validate the assertion and authenticate the user 526. Once the user has been authenticated, communication can occur directly between the identified browser and the selected SaaS application 510, thus allowing the user 526 to use the client 302 to access the selected SaaS application 510.

In some examples, the preferred browser identified by the gateway service 508 can be a specialized browser embedded in the resource access application 524 (when the resource application is installed on the client 302) or provided by one of the resource feeds 506 (when the resource application 524 is located remotely), e.g., via a secure browser service. In such examples, the SaaS applications 510 can incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 302 such that the watermark will appear as displayed on the screen if the user tries to print or take a screenshot. Further, in some implementations, when a user selects a hyperlink within a SaaS application, the specialized browser can send the URL for the link to an access control service (e.g., implemented as one of the resource feed(s) 506) for assessment of its security risk by a web filtering service. For approved URLs, the specialized browser can be permitted to access the link. For suspicious links, however, the web filtering service can have the client interface service 516 send the link to a secure browser service, which can start a new virtual browser session with the client 302, and thus allow the user to access the potentially harmful linked content in a safe environment.

In some examples, in addition to or in lieu of providing the user 526 with a list of resources that are available to be accessed individually, as described above, the user 526 can instead be permitted to choose to access a streamlined feed of event notifications and/or available actions that can be taken with respect to events that are automatically detected with respect to one or more of the resources. This streamlined resource activity feed, which can be customized for each user 526, can allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed can be accompanied by a discrete set of user-interface elements, e.g., "approve," "deny," and "see more detail" buttons, allowing a user to take one or more simple actions with respect to each event right within the user's feed. In some implementations, such a streamlined, intelligent resource activity feed can be enabled by one or more micro-applications, or "microapps," that can interface with underlying associated resources using, for example, application programming interfaces (APIs) or the like. The responsive actions can be user-initiated activities that are taken within the microapps and that provide inputs to the underlying applications through the API or other interface. The actions a user performs within the microapp can, for example, be designed to address specific common problems and use cases quickly and easily, adding to increased user productivity (e.g., request personal time off, submit a help desk ticket, etc.). In some examples, notifications from such event-driven microapps can additionally or alternatively be pushed to clients 302 to notify a user 526 of something that requires the user's attention (e.g., approval of an expense report, new course available for registration, etc.).

Figure 5C:
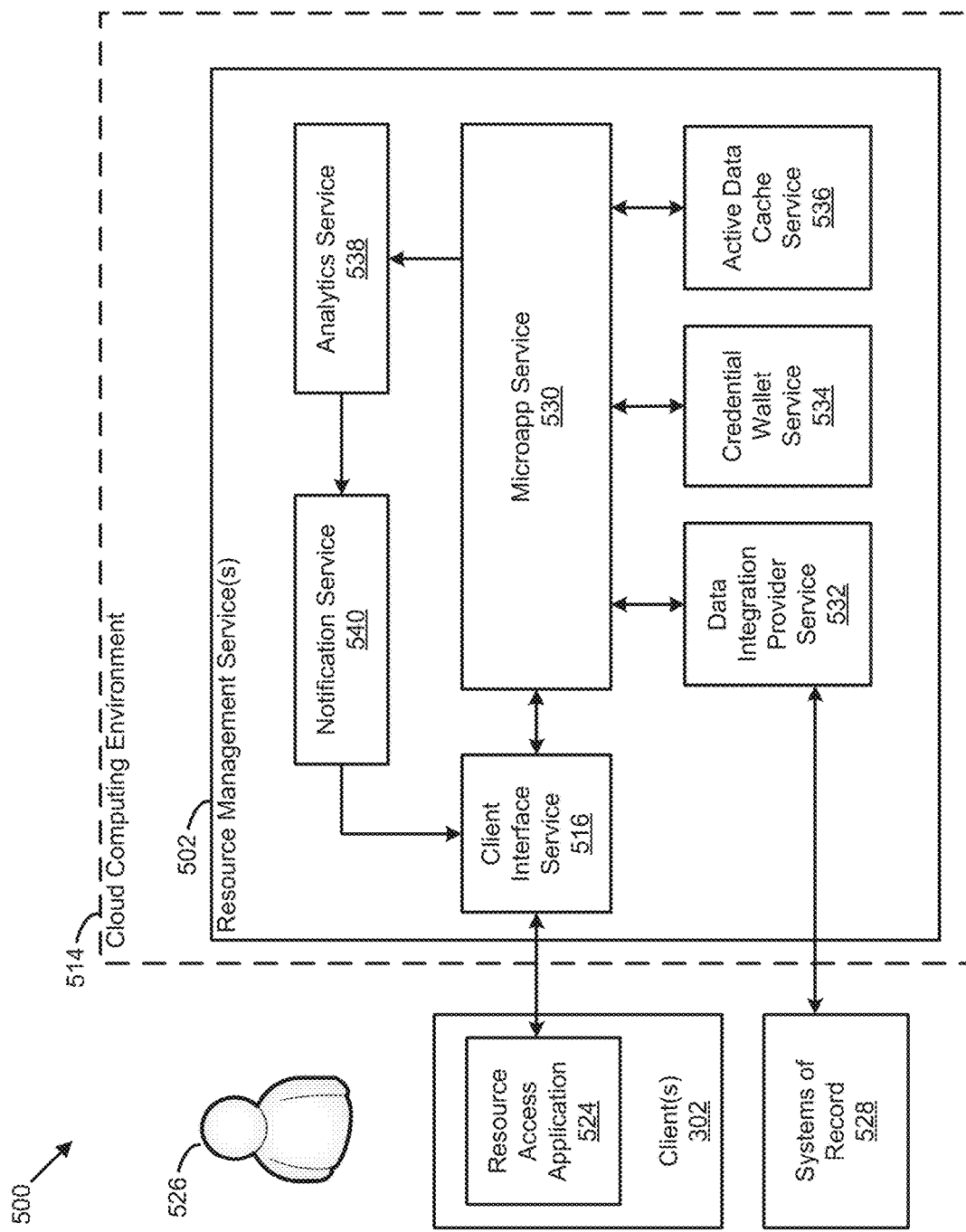

FIG. 5C is a block diagram similar to that shown in FIG. 5B but in which the available resources (e.g., SaaS applications, web applications, Windows applications, Linux applications, desktops, file repositories and/or file sharing systems, and other data) are represented by a single box 528 labeled "systems of record," and further in which several different services are included within the resource management services block 502. As explained below, the services shown in FIG. 5C can enable the provision of a streamlined resource activity feed and/or notification process for a client 302. In the example shown, in addition to the client interface service 516 discussed above, the illustrated services include a microapp service 530, a data integration provider service 532, a credential wallet service 534, an active data cache service 536, an analytics service 538, and a notification service 540. In various implementations, the services shown in FIG. 5C can be employed either in addition to or instead of the different services shown in FIG. 5B.

In some examples, a microapp can be a single use case made available to users to streamline functionality from complex enterprise applications. Microapps can, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps can streamline routine tasks for frequently performed actions and provide users the ability to perform actions within the resource access application 524 without having to launch the native application. The system shown in FIG. 5C can, for example, aggregate relevant notifications, tasks, and insights, and thereby give the user 526 a dynamic productivity tool. In some implementations, the resource activity feed can be intelligently populated by utilizing machine learning and artificial intelligence (AI) algorithms. Further, in some implementations, microapps can be configured within the cloud computing environment 514, thus giving administrators a powerful tool to create more productive workflows, without the need for additional infrastructure. Whether pushed to a user or initiated by a user, microapps can provide short cuts that simplify and streamline key tasks that would otherwise require opening full enterprise applications. In some examples, out-of-the-box templates can allow administrators with API account permissions to build microapp solutions targeted for their needs. Administrators can also, in some implementations, be provided with the tools they need to build custom microapps.

Referring to FIG. 5C, the systems of record 528 can represent the applications and/or other resources the resource management services 502 can interact with to create microapps. These resources can be SaaS applications, legacy applications, or homegrown applications, and can be hosted on-premises or within a cloud computing environment. A microapp page builder can, for example, connect to legacy, on-premises, and SaaS systems to create streamlined user workflows via microapp actions. The resource management services 502, and in particular the data integration provider service 532, can, for example, support REST API, JSON, OData-JSON, and 6ML. As explained in more detail below, the data integration provider service 532 can also write back to the systems of record, for example, using OAuth2 or a service account.

In some examples, the microapp service 530 can be a single-tenant service responsible for creating the microapps. The microapp service 530 can send raw events, pulled from the systems of record 528, to the analytics service 538 for processing. The microapp service can, for example, periodically pull active data from the systems of record 528.

In some examples, the active data cache service 536 can be single-tenant and can store all configuration information and microapp data. It can, for example, utilize a pertinent database encryption key and per-tenant database credentials.

In some examples, the credential wallet service 534 can store encrypted service credentials for the systems of record 528 and user OAuth2 tokens.

In some examples, the data integration provider service 532 can interact with the systems of record 528 to decrypt end-user credentials and write back actions to the systems of record 528 under the identity of the end-user. The write-back actions can, for example, utilize a user's actual account to ensure all actions performed are compliant with data policies of the application or other resource being interacted with.

In some examples, the analytics service 538 can process the raw events received from the microapps service 530 to create targeted scored notifications and send such notifications to the notification service 540.

Finally, in some examples, the notification service 540 can process any notifications it receives from the analytics service 538. In some implementations, the notification service 540 can store the notifications in a database to be later served in a notification feed. In other implementations, the notification service 540 can additionally or alternatively send the notifications out immediately to the client 302 as a push notification to the user 526.

In some implementations, a process for synchronizing with the systems of record 528 and generating notifications can operate as follows. The microapp service 530 can retrieve encrypted service account credentials for the systems of record 528 from the credential wallet service 534 and request a sync with the data integration provider service 532. The data integration provider service 532 can then decrypt the service account credentials and use those credentials to retrieve data from the systems of record 528. The data integration provider service 532 can then stream the retrieved data to the microapp service 530. The microapp service 530 can store the received systems of record data in the active data cache service 536 and also send raw events to the analytics service 538. The analytics service 538 can create targeted scored notifications and send such notifications to the notification service 540. The notification service 540 can store the notifications in a database to be later served in a notification feed and/or can send the notifications out immediately to the client 302 as a push notification to the user 526.

In some implementations, a process for processing a user-initiated action via a microapp can operate as follows. The client 302 can receive data from the microapp service 530 (via the client interface service 516) to render information corresponding to the microapp. The microapp service 530 can receive data from the active data cache service 536 to support that rendering. The user 526 can invoke an action from the microapp, causing the resource access application 524 to send that action to the microapp service 530 (via the client interface service 516). The microapp service 530 can then retrieve from the credential wallet service 534 an encrypted Oauth2 token for the system of record for which the action is to be invoked and can send the action to the data integration provider service 532 together with the encrypted Oath2 token. The data integration provider service 532 can then decrypt the Oath2 token and write the action to the appropriate system of record under the identity of the user 526. The data integration provider service 532 can then read back changed data from the written-to system of record and send that changed data to the microapp service 530. The microapp service 532 can then update the active data cache service 536 with the updated data and cause a message to be sent to the resource access application 524 (via the client interface service 516) notifying the user 526 that the action was successfully completed.

Sample Process Examples

Figure 6A:
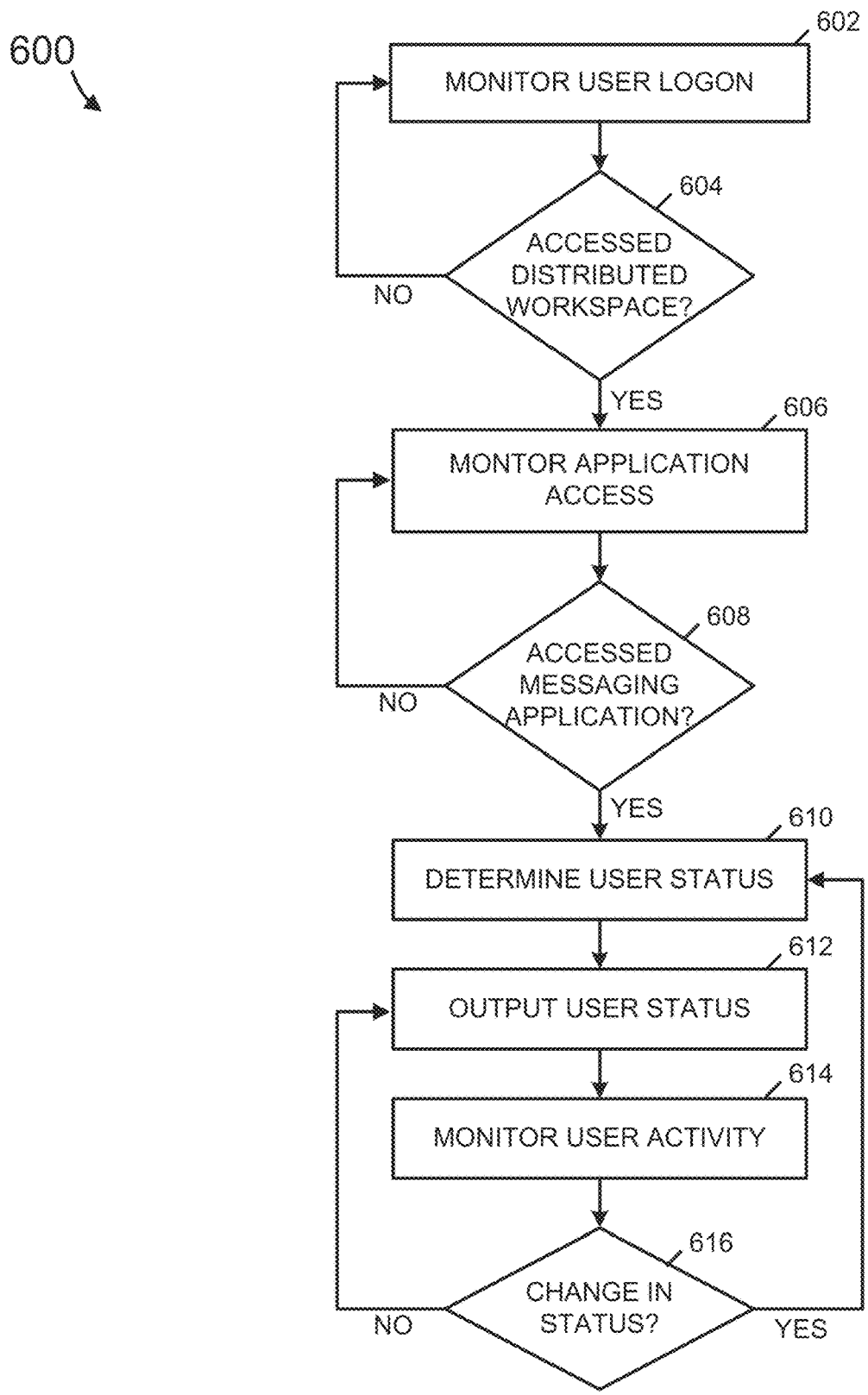
FIGS. 6A-6C are flow diagrams for determining and updating a current user status for a user of a messaging application, in accordance with an example of the present disclosure.

FIG. 6A illustrates the sample process 600 for determining the status of a user of a client device as it pertains to their availability for one or more messaging applications. The process 600 as shown in FIG. 6A can be implemented, for example, by a processor of a computing device such as the workspace host device 110 and/or the messaging application system 116 as shown in FIG. 1.

As shown in FIG. 6A, the process 600 can include monitoring 602 user logon information to determine when the user has accessed the distributed workspace system. For example, the processor can monitor 602 communication between the client device associated with the user and a remote device such as a workspace host device as described herein. Based upon the communication between these devices, the processor can determine 604 whether the user has accessed the distributed workspace. If the processor determines 604 that the user has not accessed the distributed workspace, the processor can continue to monitor 602 the user logon process. If, however, the processor does determine 604 that the user has accessed the distributed workspace, the processor can monitor 606 user activity to determine which applications the user of the client device has accessed. For example, as shown in FIG. 6A, the processor can determine 608 whether the user of the client device has accessed one or more messaging applications. In certain implementations, the processor can determine 608 whether the user of the client devices accessed the messaging application by determining whether an instance of the messaging application has been launched or otherwise opened by the user.

If the processor determines 608 that the user has not accessed the messaging application, the processor can continue to monitor 606 the applications accessed by the user of the client device. If, however, the processor does determine 608 that the user of the client device has accessed one or more messaging applications, the processor can determine the current user status for the user of the client device. Additional details related to determining 610 the current user status are described in the discussion of FIG. 6B below.

As further shown in FIG. 6A, the processor can output 612 the determined current user status to other users of the one or more messaging applications, e.g., one or more preferred and actively running messaging applications on the client device as described herein. For example, the current user status for the user of the client device can include available, away, busy but interruptible, focused, uninterruptible, and other similar status states. The processor can thus output 612 an appropriate indication of the determined current user status to other users of the one or more messaging applications such that the other users are provided an indication of the user of the client devices availability to communicate via the one or more messaging applications.

In addition to determining and outputting the current user status for the user of the client device, the processor can further determine and output additional information such as user location information. For example, the processor can determine or otherwise receive information related to the user's current IP and/or network address. Based upon this information, the processor can determine a general or specific location for an individual user. For example, based upon the user's network address, the processor can determine that the user is working in their office. In certain implementations, the current user status for the user of the client device can be updated accordingly to provide the additional location information. Such an implementation can be helpful for users that work remotely, travel regularly, or work a hybrid schedule where they work in the office for a few days a week and work remotely a few days a week. In such examples, by providing the additional location information, another person such as a co-worker or manager looking for the user of the client device can have the option to personally visit the user if possible.

As further shown in FIG. 6A, the processor can continue to monitor 614 user activity for the user of the client device to determine whether the current user status has changed over time. For example, the processor can receive updated calendar information from a calendar application associated with the user of the client device, receive updated system interaction information for the user of the client device indicating what application the user of the client device is currently accessing, and other similar information indicative of the user's current activity level and availability. Based upon this monitored user activity information, the processor can determine 616 whether there is a change in the current user status for the user of the client device. If the processor does not determine 616 that there is a change in status, the processor can continue to output 612 the current user status. If, however, the processor does determine 616 that there is a change in user status, the processor can determine 610 the updated user status for the user of the client device. The processor can then output 612 the updated user status for the user of the client device and continue to monitor 614 the user for any additional changes in in user activity.

Figure 6B:
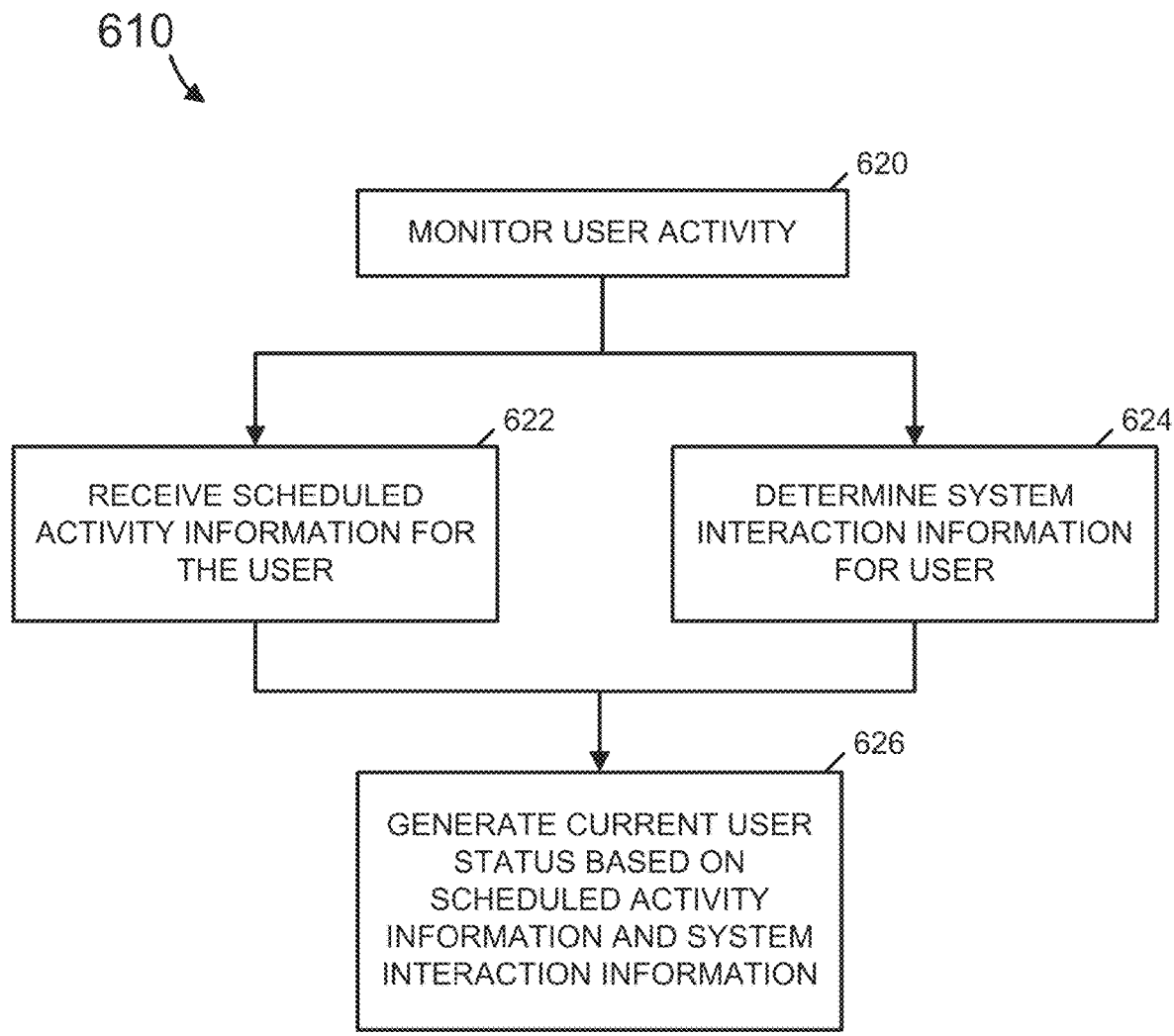

FIG. 6B includes a more detailed view of the determining 610 user status process step as showed in FIG. 6A. As shown in FIG. 6B, the processor can monitor 620 user activity as the user engages with one or more applications within the distributed workspace system as described herein. The processor can receive 622 scheduled activity information for the user. In certain implementations, the scheduled activity information for the user can include, for example, meeting information extracted or otherwise received from a calendar application or other similar scheduling application. In some examples, the meeting information can also include specific details such as time, location, participant information, meeting notes and other relevant materials for the meeting, and other similar meeting information.

As further shown in FIG. 6B, the processor can also monitor and determine 624 system interaction information for the user. In certain implementations, the system interaction information can include, for example, one or more applications the user is currently interacting with, the type of interaction the user is performing, keyboard and/or other similar input device activity associated with the user, duration of time the user has been accessing the application, another similar system interaction information.

Figure 6C:
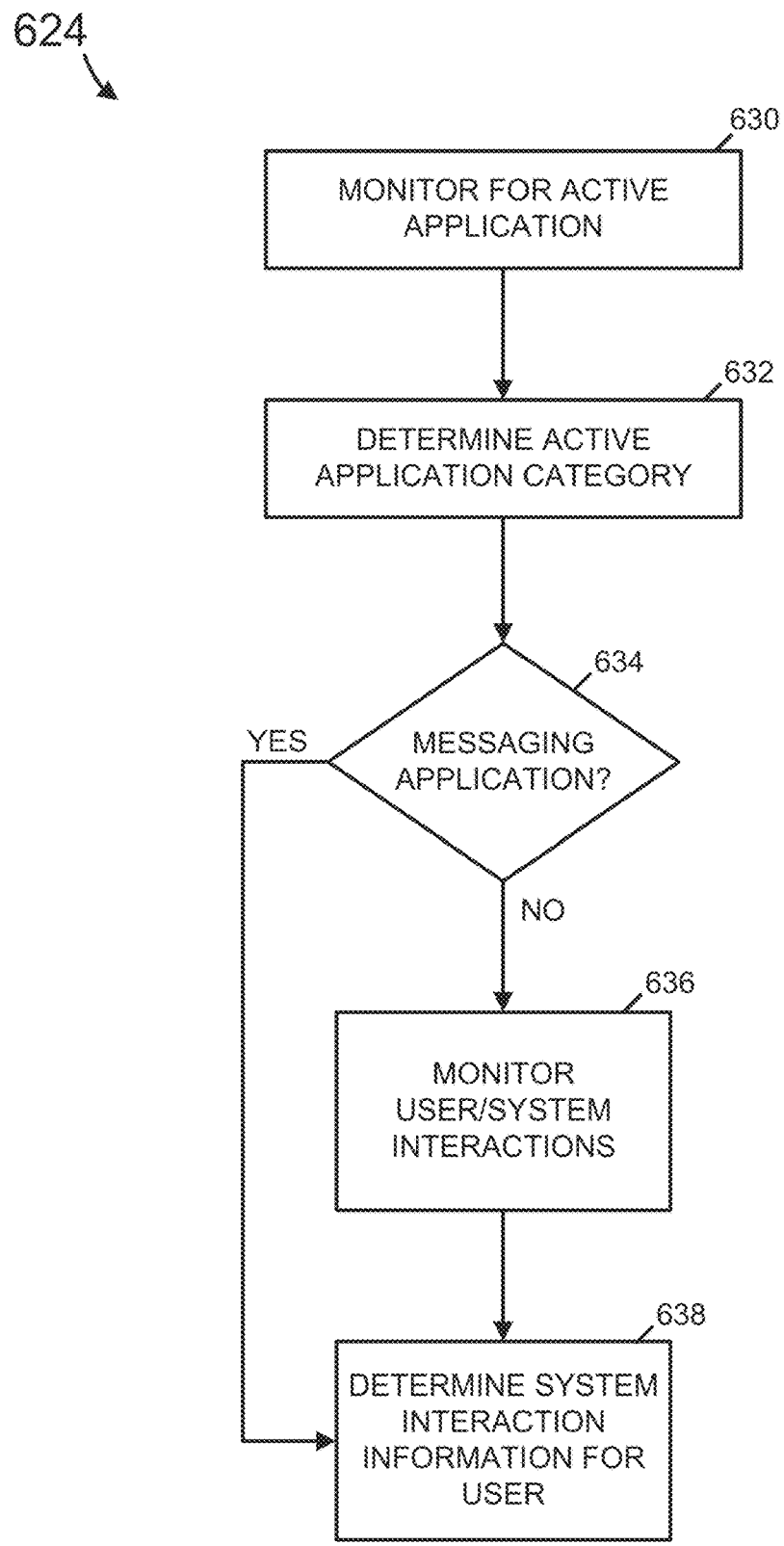

FIG. 6C includes a more detailed view of the determining 624 system interaction for the user. As shown in FIG. 6C, the processor can monitor 630 user activity for an active application. For example, the processor can monitor information being displayed on the user's device for an active application window and determine what application is associated with the active application window. In certain implementations, the processor can determine the active application based upon a title/menu bar or other similar information contained within the active application window. If the active application window is a browser window, the processor can parse or otherwise analyze an address contained within the browser window (e.g., a URL address or other similar address) to determine what application is currently running within the active browser window.

The processor can further determine 632 a category of the active application. For example, the active application can be one or more of a messaging application as described herein, a coding application, a billing application, a task management application, a spreadsheet application, a web browsing application, and email client application, a file management application, and other similar application categories. The processor can then determine 634 if the application is a messaging application.

If the application is a non-messaging application, the processor can monitor 636 the user's interactions with the active application. For example, monitoring 636 the user's interactions with the active application can include monitoring for user input on an input device such as keyboard clicks and mouse input information such as cursor movement and clicking. Based upon the user's interactions with the active application, the processor can determine 638 the system interaction information for the user as shown in FIG. 6B and described herein. In some examples, the category of active application can also factor into the system interaction information for a user. Some applications, such as performance review applications, word processing applications, billing review applications, and other similar review applications, can require a user's attention with minimal inputs from the user on an input device such as a keyboard and/or mouse. In such an example, the processor can update the user's system interaction information based upon the determined active application category as discussed herein.

Conversely, the processor determined 634 that the user is accessing messaging application, the processor can determine 638 the system interaction information for the user and provide an indication that the user is actively using the messaging application and, as such, the user's availability may be determined based upon their scheduled activity information as shown in FIG. 6B and described herein.

Referring back to FIG. 6B, based upon the scheduled activity information and system interaction information, the processor can generate 626 the current user status for the user, the current user status indicative of the availability of the user to participate in, for example, a communications session associated with one or more messaging applications as described herein.

In some examples the processor can use a trained machine learning classifier to generate 626 the current user status. For example, the machine learning classifier can use historic user data collected from previous user sessions in which the user interacts with one or more messaging applications. Information collected during those sessions, including, for example, scheduled activity information and system interaction information as described above, can be labeled for use as training and verification data, and the recorded outputs of the user's activity can be used as expected outputs for the training and verification data. The machine learning classifier can then be trained and verified using the training and verification data for the user. Once trained and verified, the processor can access the machine learning classifier to generate 626 user status based upon newly received scheduled activity information and system interaction information as described above.

In other examples, the processor can use a rule set for generating 626 the current user status. For example, the rule set can include a rule defining that when the user is accessing a particular application (e.g., the application is the active window in the user's workspace) and the user's keyboard is active (e.g., more than 30 keypresses detected per minute), the user is determined to be busy and uninterruptable. In such an example, the processor can generate 626 the current user status based upon an analysis of the received scheduled activity information and the determined system interaction information for the user according to the defined rule set as described herein.

User communication sessions can be implemented via one or more messaging applications implemented using a messaging interface such as messaging interface 106 as shown in FIG. 1. The interface can be implemented as a user accessible control in, for example, a distributed workspace application. For example, FIG. 7A illustrates a sample view of a user interface screen 700 that is displayed on a client computing device such as computing device 102 as shown in FIG. 1 and described above, and displayed by a workspace application such as, for example, workspace application 104.

Figure 7A:
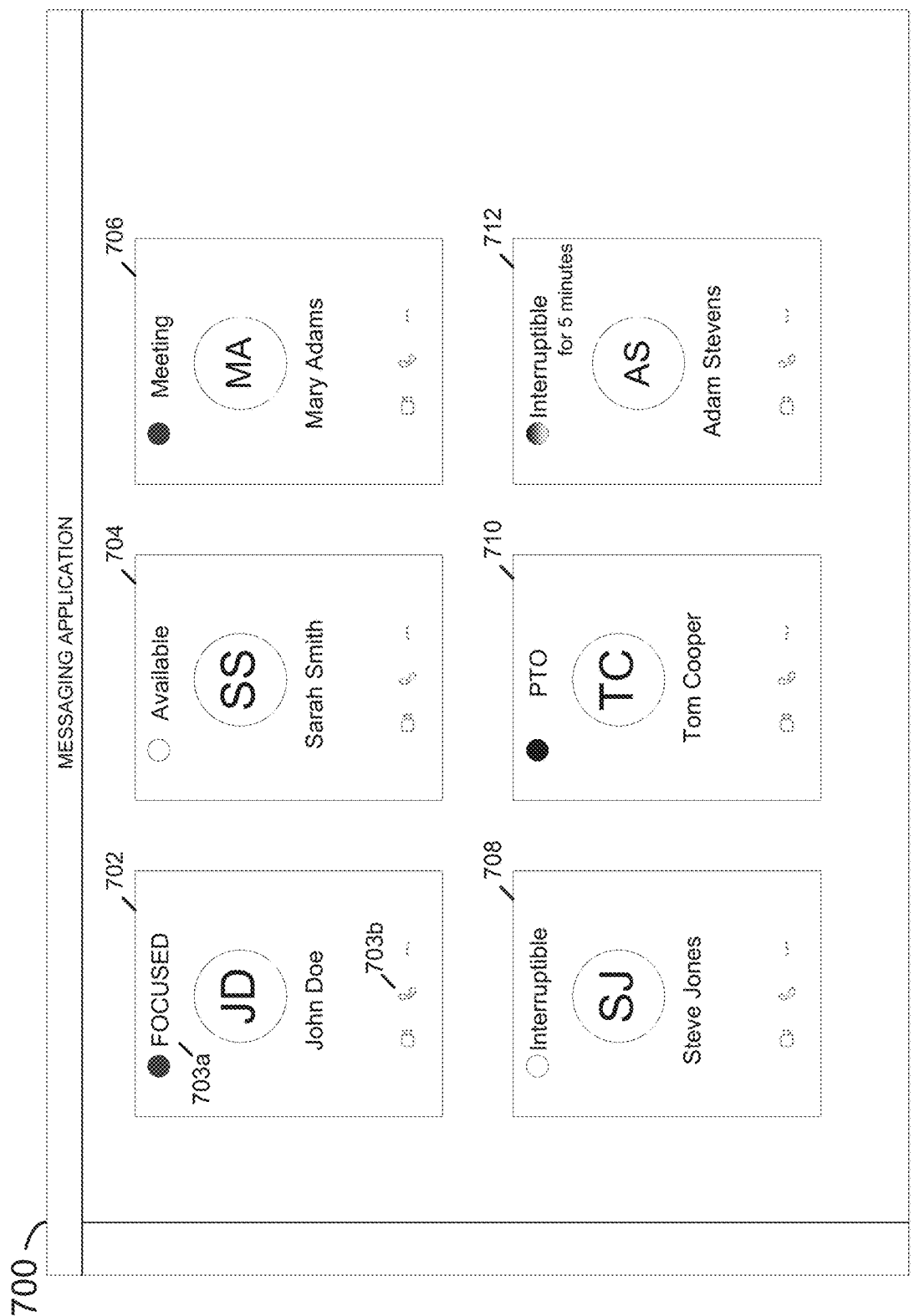
FIGS. 7A and 7B are screenshots of a messaging application using the intelligible status updates as described herein, in accordance with an example of the present disclosure.

As illustrated in FIG. 7A, the screen 700 includes user interface controls 702, 704, 706, 708, 710, and 712. In the example as shown in FIG. 7A, each of the user interface controls 702, 704, 706, 708, 710, and 712 is associated with a particular contact within the messaging application. For example, user interface control 702 represents contact information for contact "John Doe". The user interface control 702 includes a current status identifier 703a for the contact. For example, as shown in FIG. 7A, the status identifier 703A for John Doe indicates that the contact is currently focused and is likely unavailable. The user interface control 702 can also include user controls 703b for establishing a communication session with the contact. For example, as shown in FIG. 7A, the controls 703b can include user-selectable icons for establishing a video call or an audio call with the contact. In certain implementations, if the contact is unavailable or uninterruptable, the controls 703b may be inaccessible.

As shown in screen 700, a contact can have one or more varying status indicators as described herein. For example, contact Sarah Smith in user interface control 704 is listed as available, contact Mary Adams in user interface control 706 is listed as in a meeting, contact Steve Jones in user interface control 708 is listed as uninterruptible, contact Tom Cooper in user interface control 710 is listed as currently on paid time off, and contact Adam Stevens in user interface control 712 is currently listed as interruptible for the next five minutes.

Figure 7B:
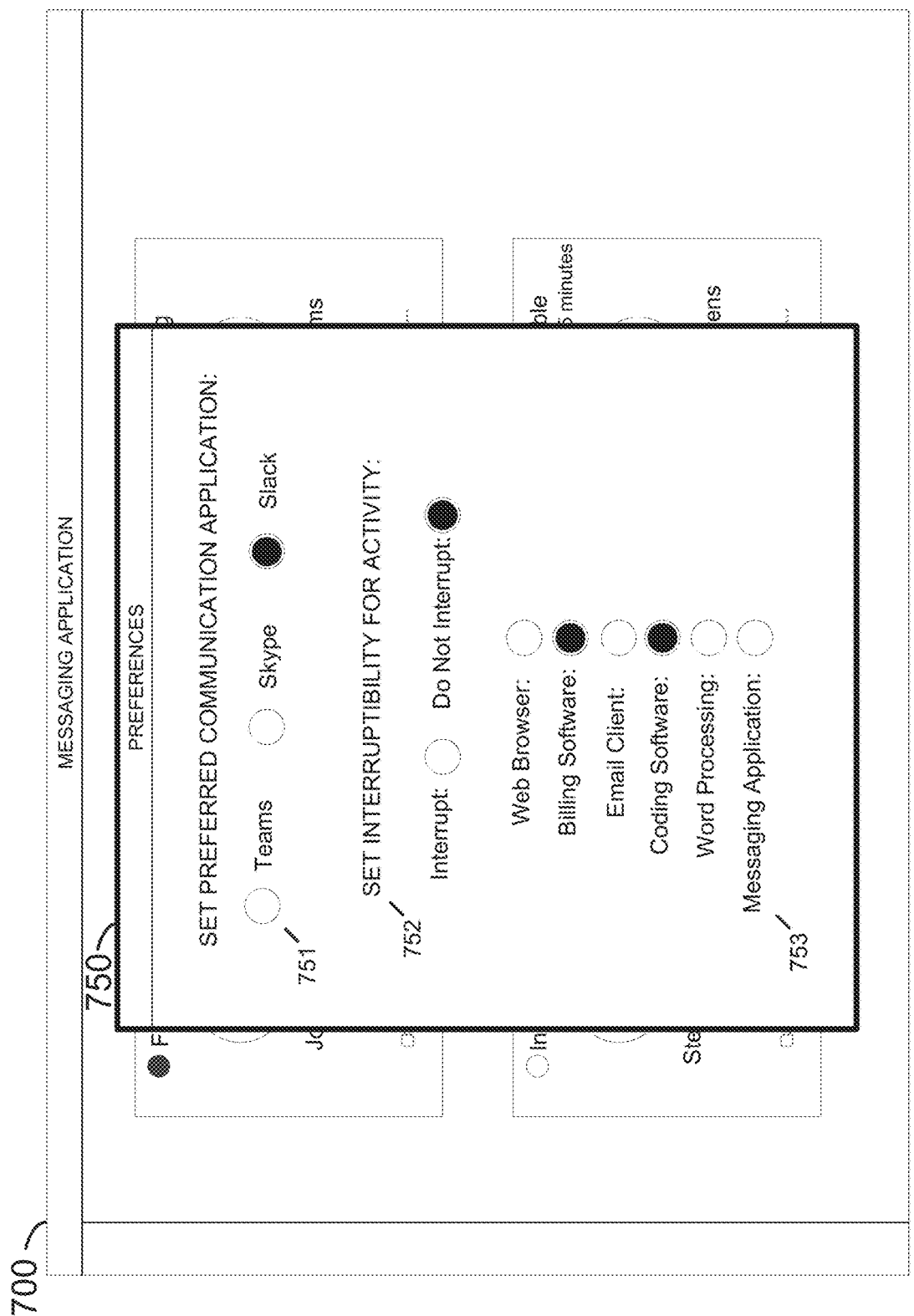

In addition to viewing available contacts and their current status as shown in FIG. 7A, a user can also access a set of preferences within the messaging application as described herein. As shown in FIG. 7B, a preferences control 750 can be accessed by the user of the messaging application and, for example, can be overlaid on screen 700 as shown in FIG. 7B.

The preferences control 750 can include various user selectable controls for customizing the user's experience with the messaging application.

For example, as shown in FIG. 7B, preferences control 750 can include user control 751 for selecting a preferred communication application. For example, as shown in FIG. 7B, the user can select from one or more available communication applications to function as a preferred or default communication application when using the messaging application as described herein.

The preferences control 750 can also include a set of controls 752 and 753 that provide the user with the ability to set when they can and cannot be interrupted when interacting with applications associated with the distributed workspace system as described herein. For example, the control 752 can include sample instructions for the user as to how to set whether they can be interrupted when using a particular application. As shown in FIG. 7B, the control 752 defines an empty radio button as okay to interrupt and a filled radio button as do not interrupt.

As further shown in FIG. 7B, the control 753 includes a listing of available distributed workspace applications. For example, the listing can include all applications regularly accessed or available to the user. The control 753 includes a set of user selectable radio buttons for determining the user's interruptability for each available in listed application. For example, as shown in FIG. 7B, the user has indicated they are available to be interrupted when using the web browser, the email client, the word processing application, and the messaging application. Conversely, as shown in the control 753, the user has indicated they are not to be interrupted when using the billing software application and the coding software application.

As described above in the discussion of FIG. 6B, a processor can use a set of rules to determine a current user status for a user of a client device. In certain implementations, the controls as shown, for example, in FIG. 7B can be used to define at least a portion of the rules set as described herein. For example, if the user sets a control 753 to indicate that they cannot be interrupted when using a particular application, the rule set for generating the current user status can be updated to reflect that selection.

However, it should be noted that the controls as shown in the preferences control 750 is provided by way of example only and can be modified depending upon the implementation in design of the messaging application as described herein. Additionally, both of FIGS. 7A and 7B are provided by way of example only to illustrate sample user interface screens and controls for a messaging system including dynamically updated and intelligible user status updates as described herein.

Figure 8:
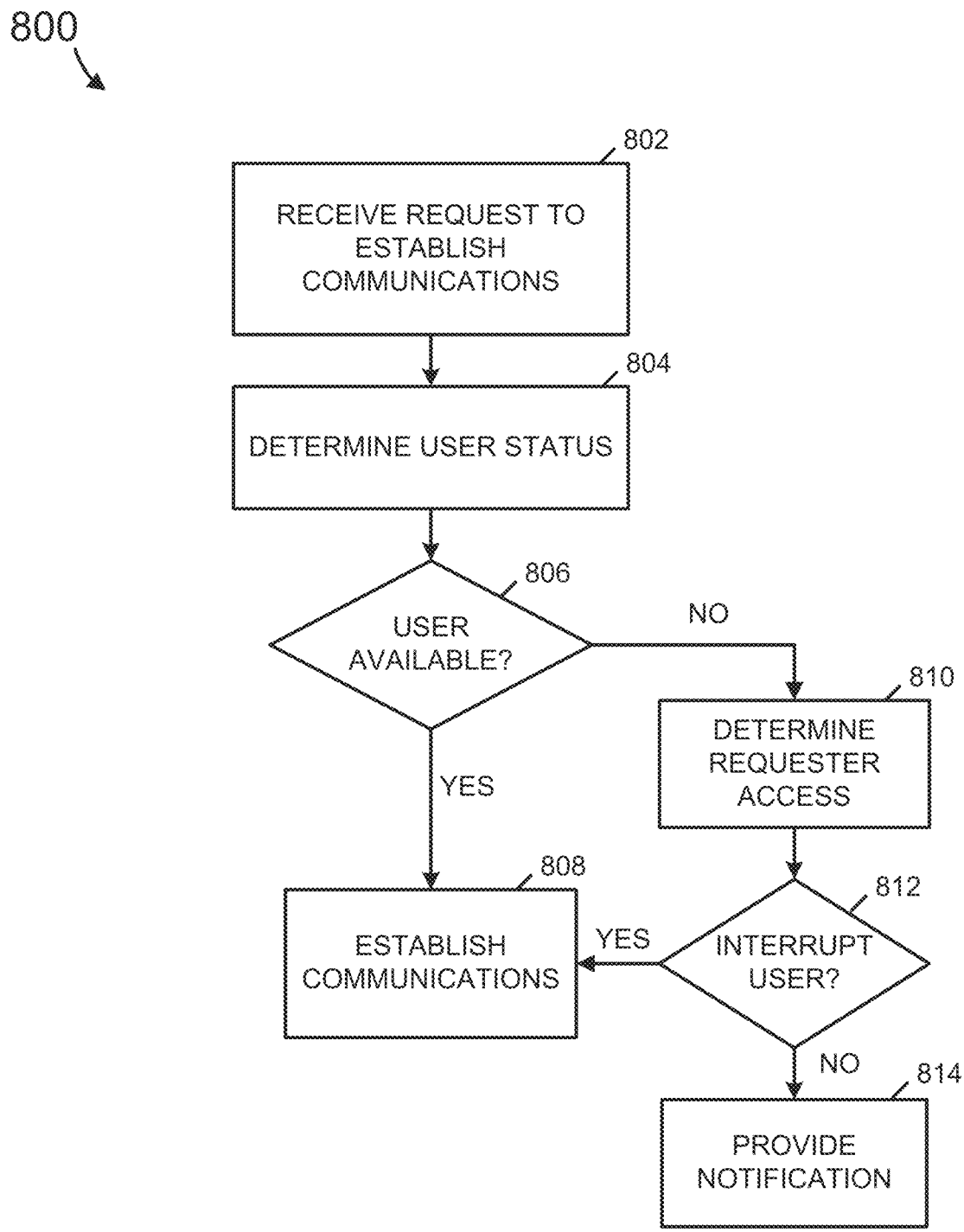
FIG. 8 is a flow diagram for processing a request for communications, in accordance with an example of the present disclosure.

FIG. 8 illustrates a sample process 800 for processing a request to establish communications between a requesting device and a user device as described herein. The process 800 as shown in FIG. 8 can be implemented, for example, by a processor associated with a remote computing device such as workspace host device 110 and/or messaging application system 116 as shown in FIG. 1 and described herein.

As shown in FIG. 8, the processor can receive 802 one or more requests to establish communications between two or more devices within a distributed workspace system. The processor can process the request and determine 804 the current user status of the user of the end client device included in the communications request.

The processor can analyze the current user status and determine 806 whether the requested user is currently available for communicating. If the processor determines 806 that the user is available, the processor can establish 808 communications between the requesting device and the end user device. If, however, the processor determines 806 that the user is not available, the processor can determine 810 a role or level of access associated with the requester.

For example, each user in a particular distributed workspace system can have an associated role such as administrator, supervisor, participant, and other similarly assigned roles. Each assigned role can include an associated level of access. As described herein, an associated level of access can be used to override the current status level of a user. In certain implementations, a service such as the identity provider 512 as described above can be used to identify both the current status level of the requester as well as the user of the end client device. In some implementations, the identity provider can access a directory service such as a human resources platform including, for example, an employee listing or organizational hierarchy that includes each members' associated status level and/or role information.

For example, if the requester for a communication session is the user's supervisor, the processor can determine 810 that the requester's level of access is such that the user can be interrupted regardless of their current status. In such an example, the processor can determine 812 that the user is to be interrupted. The processor can then establish 808 communications between the requester and the user of the end device.

Conversely, if the processor determines 810 that the requester does not have an appropriate level of access, the processor can determine 810 not to interrupt the user and provide 814 a notification to the requester that the user is unavailable or otherwise uninterruptible and the communication will not be established.

In some examples, one or more users such as a manager or supervisor can have be assigned the role of "superuser" that has a level of access that allows that user to immediately contact any other user within a particular group or organization. In certain implementations, the organizational hierarchy can be unidirectional such that a requester with a higher level of access can always interrupt a user with a lower level of access but a requester with the lower level of access can only interrupt a user with a higher level of access if the user with the higher level of access is available and interruptible as described herein.

Figure 9:
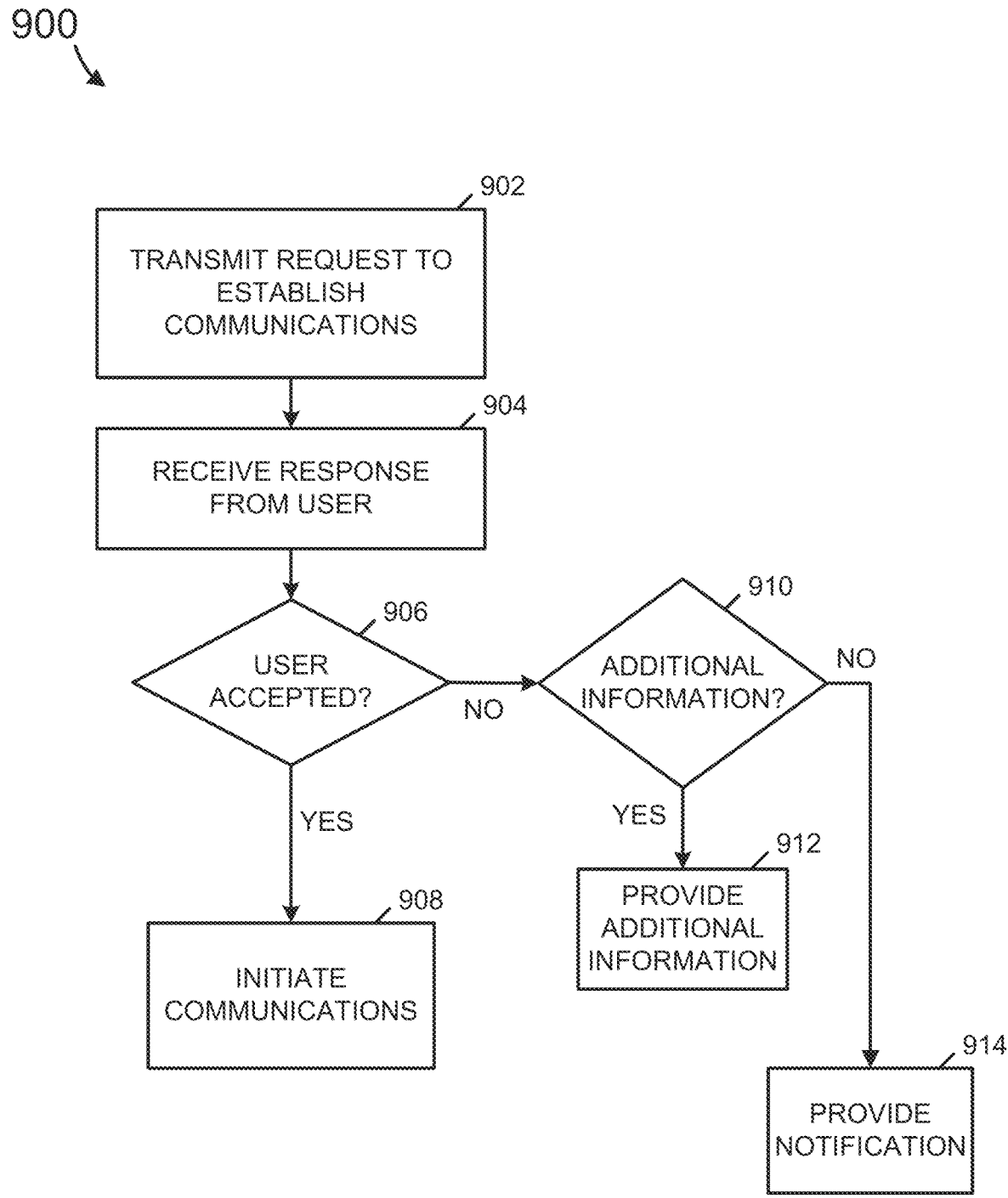
FIG. 9 is a flow diagram for establishing communication between devices using a messaging application, in accordance with an example of the present disclosure.

FIG. 9 illustrates process 900 illustrating a more detailed process flow for establishing communications between a requesting device and an end client device as described herein. The process 900 as shown in FIG. 9 can be implemented, for example, by a processor associated with a remote computing device such as workspace host device 110 and/or messaging application system 116 as shown in FIG. 1 and described herein.

As shown in FIG. 9, the processor can transmit 902 a request to establish communications to the end client device as described above in regard to FIG. 8. The processor can receive 904 a response from the user of the end client device and process the user response. Based upon the user response, the processor can determine 906 whether the user of the end client device has accepted the request to establish communications. If the processor determines 906 that the user has accepted the request, the processor can initiate 908 communications between the requesting device and the end client device.

Conversely, if the processor determines 906 that the user has not accepted the request to establish communications, the processor can determine 910 whether the user response includes any additional information. For example, when responding to the request to establish communications, a user of the end client device can provide additional information such as future availability and/or additional information such as a text message including instructions to the requester. For example, the user of the end client device can include an indication that they will be available in 10 minutes and that the requester can feel free to call them back then.

Referring back to FIG. 9, the processor can determine 910 whether there is additional information contained within the user response. If the processor determines 910 there is additional information, the processor can provide 912 the additional information to the requester. If, however, the processor determines 910 there is no additional information in the user response, the processor can provide 914 notification to the requester that the user of the end client device has declined the request to establish communications.

In certain implementations, the request to establish communications can include a direct feed of the requester to the user of the end client device. Depending upon the type of communication session that the requester is seeking to establish, the direct feed can be modified accordingly. For example, if the requester seeks to establish a video call with the user of the end client device, the request to establish communications can include a video feed of the requester reaching out directly to the user of the end client device. The user of the end client device can then determine whether to establish direct communication session with the requester or to decline/provide additional information as is described above in regard to FIG. 9.

In certain implementations, beyond merely analyzing system interaction information and scheduled activity information for a user, a processor can also analyze historic user information to determine current user status. For example, if a user historically declines all calls when using a particular application, the processor can determine that the user is likely unavailable when using that application and can update the current user status accordingly. Similarly, if a user is more amenable to interruptions from a particular user, the processor may dynamically update the current user status such that it appears differently for individual users of a messaging application as described herein. For example if user a is more likely to accept communications from user B when accessing a particular application, the current user status as displayed in user B's workspace may indicate that user a is interruptible when user a appears as uninterruptible to users other than user B. As described above in regard to FIG. 6B, a trained machine learning classifier can be used to determine whether a user is likely to answer a request from another particular user. When training the machine learning classifier, additional labeled inputs such as information related to how a user responds to requests from other identified users can be used to further train the machine learning classifier. In such an example, the processor can use the trained machine learning classifier to process and handle requests from different user in a different manner.

Additionally, the message application as described herein can use additional information about the user to determine the user's availability. For example, if the user has just completed a meeting and has another meeting in 15 minutes, the processor as described herein can determine that the user is likely available between the meetings. The processor can also take location information into account. For example, the processor can determine based upon the user's logon information if the user is in the office or working remotely. If the user is in the office, the processor may determine that the user is more likely to be interruptible than if working remotely. Additionally, a request to contact the user may include an indication to the requester that the user is in the office and may be available for an in-person meeting. Such additional determinations can be made using a trained machine learning classifier or a set of rules. For example, a particular user can define a rule indicating whether they are interruptible or not during short durations of time (e.g., fifteen minutes or less) between meetings or other scheduled activities. When determining the current user status for that user, the processor can further analyze whether the user's activity pattern matches such a scenario and further determine whether the user is interruptible between scheduled activities accordingly.

As noted above, the processor can analyze the user's keyboard activity to determine whether the user is engaged or otherwise focused on an activity. Additional input devices such as a user's webcam can also be used to determine whether the user is interruptible. For example, if the user appears to be concentrating on their monitor for an extended period of time (e.g., more than 10 minutes), the processor may determine that the user is focused and not to be interrupted. In certain implementations, the processor can access a facial recognition algorithm or other similar algorithm for capturing a picture of the user's face and determining one or more features of the user's face. Based upon these determined features, the processor can further determine information about the user such as where their attention is currently directly and whether the user's eyes are focused on something in particular. In such examples, the processor can determine that the user is concentrating and should not be interrupted.

In some examples, the processor of the messaging application system can also monitor communications between other parties for an indication that a particular user is being discussed. For example, if two parties are discussing the work product of a third party, the processor may determine the availability of the third person and suggest that the two parties reach out to the third party if they are available and interruptible. For example, the processor can user a rule set as described herein to determine when to provide such a suggestion. In certain implementations, the process can monitor the communications between the two parties to determine if a certain number of references to a third party occurs within a particular period of time. For example, if at least three references to a third party occur within five minutes, the processor can determine the availability of the third party and recommend that the two discussing parties contact the third party if the third party is available.

Figure 10:
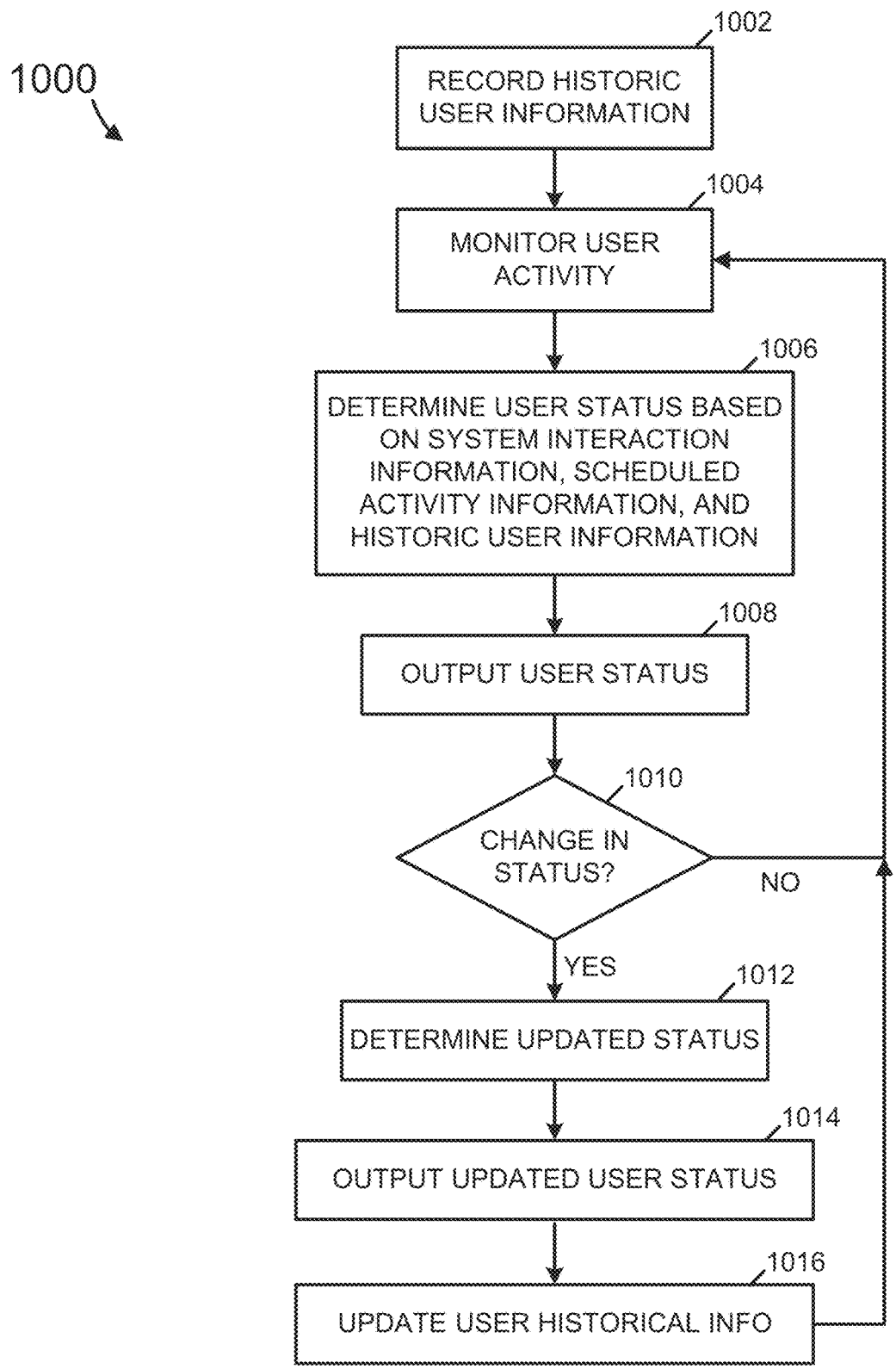
FIG. 10 is a flow diagram for determining and updating a current user status based upon historical user information, in accordance with an example of the present disclosure.

FIG. 10 illustrates a sample process 1000 that includes determining and/or updating a current user's status based upon historical information. The process 1000 as shown in FIG. 10 can be implemented, for example, by a processor associated with a remote computing device such as the workspace host device 110 and/or the messaging application system 116 as shown in FIG. 1 and described herein.

As shown in FIG. 10, the processor can record 1002 historic user information as the user interacts with the distributed workspace system as described herein. The processor can further monitor 1004 user activity of the system including, for example, interaction with one or more messaging applications as described herein. The processor can further determine 1006 a current user status based on system interaction information, scheduled activity information, and the historic user information collected, for example, during previous user sessions in which the user interacted with one or more messaging applications in a distributed workspace as described herein. The processor can output 1008 the current user status and continue to monitor be user activity to determine any changes in user status.

As further shown in FIG. 10, the processor can determine 1010 changes in the user status. If the processor does not determine 1010 that there is a change in user status, the processor can continue to monitor 1004 the user activity. If, however, the processor does determine 1010 a change in user status, the processor can determine 1012 the updated user status as described herein above. The processor can then output 1014 the updated user status and update 1016 the user historical information to reflect any changes in the user's status. The processor can then continue to monitor 1004 the user activity as described herein.

It should be noted that the processes 600, 800, 900, and 1000 as shown in 6, 8, 9, and 10 are provided by way of example only. It should also be noted that the specific process flow, and the order of sequence steps associated with the process flows as described herein, are provided by way of example only. Various steps contained within the process flows as described herein can be altered, reordered, or otherwise omitted depending upon the implementation of the techniques as described herein.

Hardware Implementation Examples

Figure 11:
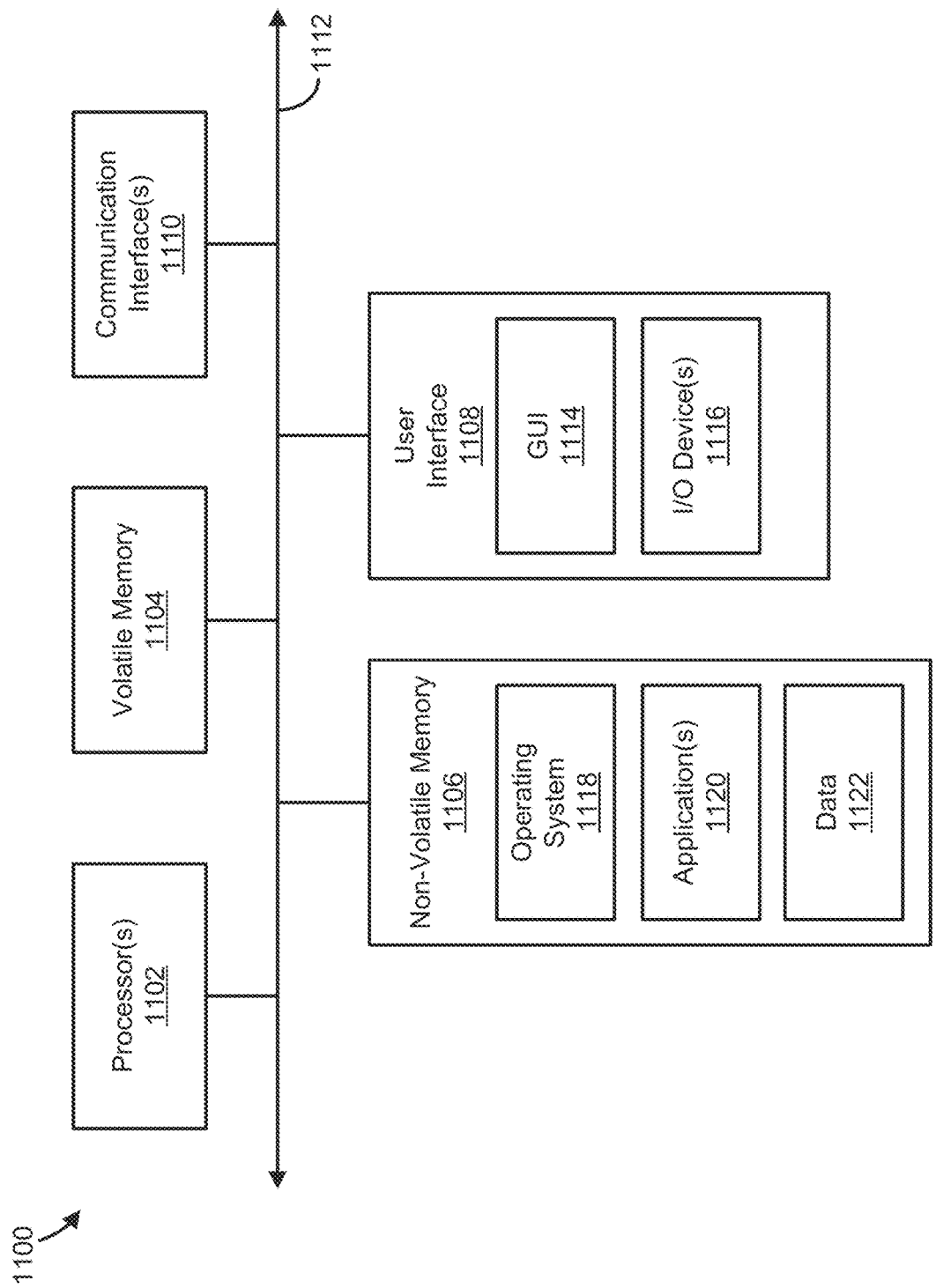
FIG. 11 is a block diagram of one or more of the computing devices as described herein, in accordance with at least one example of the present disclosure.

FIG. 11 depicts a block diagram of a computing device 1100 useful for practicing an example of client device 102 and/or workspace host device 110 as shown in FIG. 1 and described above. The computing device 1100 includes one or more processors 1102, volatile memory 1104 (e.g., random access memory (RAM)), non-volatile (non-transitory) memory 1106, UI 1108, one or more communications interfaces 1110, and a communications bus 1112. One or more of the computing devices 1100 can also be referred to as a computer system.

The non-volatile memory 1106 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 1108 can include a graphical user interface (GUI) 1114 (e.g., a touchscreen, a display, etc.) and one or more input/output (I/O) devices 1116 (e.g., a mouse, a keyboard, a microphone, one or more speakers, one or more cameras, one or more biometric scanners, one or more environmental sensors, and one or more accelerometers, etc.).

The non-volatile memory 1106 can store an operating system 1118, one or more applications 1120, and data 1122 such that, for example, computer instructions of the operating system 1118 and/or the applications 1120 are executed by processor(s) 1102 out of the volatile memory 1104. In some examples, the volatile memory 1104 can include one or more types of RAM and/or a cache memory that can offer a faster response time than a main memory. Data can be entered using an input device of the GUI 1114 or received from the I/O device(s) 1116. Various elements of the computing device 1100 can communicate via the communications bus 1112.

The illustrated computing device 1100 is shown merely as an example client device or server and can be implemented by any computing or processing environment with any type of machine or set of machines that can have suitable hardware and/or software capable of operating as described herein.

The processor(s) 1102 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 1102 can be analog, digital or mixed. In some examples, the processor 1102 can include multiple processor cores and/or multiple processors configured to provide functionality for parallel, simultaneous execution of instructions or for parallel, simultaneous execution of one instruction on more than one piece of data.

The communications interfaces 1110 can include one or more interfaces to enable the computing device 1100 to access a computer network such as a Local Area Network (LAN), a Wide Area Network (WAN), a Personal Area Network (PAN), or the Internet through a variety of wired and/or wireless connections, including cellular connections.

In described examples, the computing device 1100 can execute an application on behalf of a user of a client device (e.g., client device 102 as shown in FIG. 1 and described above). For example, the computing device 1100 can execute one or more virtual machines managed by a hypervisor and accessed via, for example, a client agent. Each virtual machine can provide an execution session within which applications execute on behalf of a user or a client device, such as a hosted desktop session. The computing device 1100 can also execute a terminal services session to provide a distributed workspace environment. The computing device 1100 can provide access to a remote computing environment including one or more applications, one or more desktop applications, and one or more desktop sessions in which one or more applications can execute.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

What is claimed is:

1. A computing device for determining user availability for at least one messaging application, the computing device comprising:
   a computer readable medium; and
   at least one processor operably coupled to the computer readable medium and configured to
      receive scheduled activity information for a user of a client device from the client device,
      continually monitor system interaction information received automatically from the client device as the user of the client device interacts with one or more applications accessible on the client device, the system interaction information comprising updated information regarding real-time interactions between the user of the client device and the one or more applications accessible on the client device, the one or more applications comprising at least one non-messaging application, to continually monitor comprising to
         monitor an active application window associated with an active application of the one or more applications accessible on the client device,
         determine, from the active application window, an identifier of the active application, and
         determine a category of the active application,
      automatically and continually process the scheduled activity information and the system interaction information from the active application as received from the client device to determine, based on at least the category of the active application, a current user status for the user of the client device, the current user status indicating a user's status with regard to the active application and the user's availability to communicate using at least one messaging application, and
      automatically and continually output the current user status for the user of the client device to additional users of the at least one messaging application.

2. The computing device of claim 1, wherein the at least one processor is further configured to:
   receive a communication request from at least one of the additional users of the at least one messaging application to establish communication with the user of the client device; and
   process the communication request based upon the current user status for the user of the client device.

3. The computing device of claim 2, wherein the at least one processor is configured to process the communication request based upon the current user status for the user of the client device by being further configured to:
   determine whether the user of the client device is one or more of available and/or interruptible; and
   if the user of the client device is one or more of available and/or interruptible, process the communication request to establish communication between the user of the client device and the at least one additional user.

4. The computing device of claim 1, wherein the at least one processor is further configured to:
- continually monitor updated system interaction information and/or updated scheduled activity information from the client device;
- process the updated system interaction information and/or updated scheduled activity information to determine and updated user status for the user of the client device; and
- continually output the updated user status for the user of the client device to the additional users of the at least one messaging application.

5. The computing device of claim 1, wherein the at least one processor is further configured to:
- determine historical user information for the user of the client device based upon previous user sessions of the at least one messaging application by the user of the client device; and
- determine the current user status for the user of the client device based upon the scheduled activity information, the system interaction information, and the historical user information for the user of the client device.

6. The computing device of claim 1, wherein the at least one processor is further configured to:
- receive a communication request from at least one of the additional users of the at least one messaging application to establish communication with the user of the client device;
- determine a role and associated level of access for the at least one of the additional users associated with the communication request; and
- process the communication request based upon the current user status for the user of the client device and the determined role and associated level of access for the at least one of the additional users associated with the communication request.

7. The computing device of claim 1, wherein the current user status of the user comprises at least one of available, busy but interruptible, focused, and uninterruptible.

8. The computing device of claim 1, wherein the system interaction information comprises real-time interaction information related to a non-messaging application the user of the client device is currently accessing and the scheduled activity information comprises information received from a calendar application associated with the user of the client device.

9. A method of determining user availability for at least one messaging application, the method comprising:
- receiving, by a processor, scheduled activity information for a user of a client device from the client device;
- continually monitoring, by the processor, system interaction information received automatically from the client device as the user of the client device interacts with one or more applications accessible on the client device, the system interaction information comprising updated information regarding real-time interactions between the user of the client device and the one or more applications accessible on the client device, the one or more applications comprising at least one non-messaging application, wherein continually monitoring includes
  - monitoring an active application window associated with an active application of the one or more applications accessible on the client device,
  - determining, from the active application window, an identifier of the active application, and
  - determining a category of the active application;
- automatically and continually processing, by the processor, the scheduled activity information and the system interaction information from the one or more applications as received from the client device to determine, based on at least the category of the active application, a current user status for the user of the client device, the current user status indicating a user's status with regard to the active application and the user's availability to communication using at least one messaging application; and
- automatically and continually outputting, by the processor, the current user status for the user of the client device to additional users of the at least one messaging application.

10. The method of claim 9 further comprising:
- receiving, by the processor, a communication request from at least one of the additional users of the at least one messaging application to establish communication with the user of the client device; and
- processing, by the processor, the communication request based upon the current user status for the user of the client device.

11. The method of claim 10, wherein processing the communication request based upon the current user status for the user of the client device comprises:
- determining, by the processor, whether the user of the client device is one or more of available and/or interruptible; and
- if the user of the client device is one or more of available and/or interruptible, processing, by the processor, the communication request to establish communication between the user of the client device and the at least one additional user.

12. The method of claim 9 further comprising:
- continually monitoring, by the processor, updated system interaction information and/or updated scheduled activity information from the client device;
- processing, by the processor, the updated system interaction information and/or updated scheduled activity information to determine and updated user status for the user of the client device; and
- continually outputting, by the processor, the updated user status for the user of the client device to the additional users of the at least one messaging application.

13. The method of claim 9 further comprising:
- determining, by the processor, historical user information for the user of the client device based upon previous user sessions of the at least one messaging application by the user of the client device; and
- determining, by the processor, the current user status for the user of the client device based upon the scheduled activity information, the system interaction information, and the historical user information for the user of the client device.

14. The method of claim 9 further comprising:
- receiving, by the processor, a communication request from at least one of the additional users of the at least one messaging application to establish communication with the user of the client device;
- determining, by the processor, a role and associated level of access for the at least one of the additional users associated with the communication request; and
- processing, by the processor, the communication request based upon the current user status for the user of the client device and the determined role and associated level of access for the at least one of the additional users associated with the communication request.

15. The method of claim 9, wherein the current user status of the user comprises at least one of available, busy but interruptible, focused, and uninterruptible.

16. The method of claim 9, wherein the system interaction information comprises real-time interaction information related to a non-messaging application the user of the client device is currently accessing and the scheduled activity information comprises information received from a calendar application associated with the user of the client device.

17. A non-transitory computer-readable medium storing computer-executable instructions to implement a process of determining user availability for at least one messaging application, the instructions comprising instructions to:
receive scheduled activity information for a user of a client device from the client device;
continually monitor system interaction information received automatically from the client device as the user of the client device interacts with one or more applications accessible on the client device, the system interaction information comprising updated information regarding real-time interactions between the user of the client device and the one or more applications accessible on the client device, the one or more applications comprising at least one non-messaging application, to continually monitor comprising to
monitor an active application window associated with an active application of the one or more applications accessible on the client device,
determine, from the active application window, an identifier of the active application, and
determine a category of the active application;
automatically and continually process the scheduled activity information and the system interaction information from the one or more applications as received from the client device to determine, based on at least the category of the active application, a current user status for the user of the client device, the current user status indicating a user's status with regard to the active application and the user's availability to communicate using at least one messaging application; and
automatically and continually output the current user status for the user of the client device to additional users of the at least one messaging application.

18. The non-transitory computer-readable medium of claim 17, further comprising instructions to:
receive a communication request from at least one of the additional users of the at least one messaging application to establish communication with the user of the client device;
determine whether the user of the client device is one or more of available and/or interruptible; and
if the user of the client device is one or more of available and/or interruptible, process the communication request to establish communication between the user of the client device and the at least one additional user.

19. The non-transitory computer-readable medium of claim 17, further comprising instructions to:
continually monitor updated system interaction information and/or updated scheduled activity information from the client device;
process the updated system interaction information and/or updated scheduled activity information to determine and updated user status for the user of the client device; and
continually output the updated user status for the user of the client device to the additional users of the at least one messaging application.

20. The non-transitory computer-readable medium of claim 17, further comprising instructions to:
receive a communication request from at least one of the additional users of the at least one messaging application to establish communication with the user of the client device;
determine a role and associated level of access for the at least one of the additional users associated with the communication request; and
process the communication request based upon the current user status for the user of the client device and the determined role and associated level of access for the at least one of the additional users associated with the communication request.

* * * * *